(12) United States Patent
O'Keeffe

(10) Patent No.: US 10,185,027 B2
(45) Date of Patent: Jan. 22, 2019

(54) LIDAR WITH SMART SAFETY-CONSCIOUS LASER INTENSITY

(71) Applicant: James Thomas O'Keeffe, Newark, CA (US)

(72) Inventor: James Thomas O'Keeffe, Newark, CA (US)

(*) Notice: Subject to any disclaimer, the term of this patent is extended or adjusted under 35 U.S.C. 154(b) by 0 days.

(21) Appl. No.: 15/826,643

(22) Filed: Nov. 29, 2017

(65) Prior Publication Data

US 2018/0088214 A1    Mar. 29, 2018

Related U.S. Application Data

(63) Continuation of application No. PCT/US2017/049231, filed on Aug. 29, 2017.
(Continued)

(51) Int. Cl.
*G01C 3/08* (2006.01)
*G01S 7/484* (2006.01)
(Continued)

(52) U.S. Cl.
CPC .............. *G01S 7/484* (2013.01); *G01S 7/489* (2013.01); *G01S 7/4815* (2013.01);
(Continued)

(58) Field of Classification Search
CPC ........ G01S 7/484; G01S 7/4817; G01S 17/10; G01S 17/936
See application file for complete search history.

(56) References Cited

U.S. PATENT DOCUMENTS 3,927,402 A    12/1975 Thompson
4,464,115 A    8/1984 Simpson et al.
(Continued)

FOREIGN PATENT DOCUMENTS

WO    WO2016/011557 A1    1/2016

OTHER PUBLICATIONS

International Search Report and Written Opinion for PCT Patent Application No. PCT/US17/49231, dated Nov. 3, 2017, 16 pages.
(Continued)

*Primary Examiner* — Samantha K Abraham
(74) *Attorney, Agent, or Firm* — Shay Glenn LLP

(57) ABSTRACT

In one embodiment a laser range finder generates high-intensity laser pulses with intensities above a threshold intensity (e.g. above an eye-safe intensity) in an adaptive-intensity region of the field of view. The laser range finder further generates lower intensity (e.g. eye-safe) laser pulses in a protective guard region (e.g. a guard ring) that surrounds the high-intensity laser pulses. The guard region is located in the FOV such that ingress paths to the adaptive-intensity region must first traverse the lower-intensity guard region. The laser range finder analyzes laser reflections from the guard region to improve timely prediction of object intrusion into the adaptive-intensity region, thereby providing time to determine object trajectory or object classification. Upon determination that an object is likely to intersect the high-intensity laser pulses the laser range finder can discontinue the high-intensity laser pulses and instead generate laser pulses below the threshold intensity (e.g. eye-safe intensity laser pulses).

28 Claims, 27 Drawing Sheets

Related U.S. Application Data

(60) Provisional application No. 62/380,951, filed on Aug. 29, 2016.

(51) Int. Cl.

| | | |
|---|---|---|
| *G01S 7/481* | (2006.01) | |
| *G01S 17/10* | (2006.01) | |
| *G01S 17/93* | (2006.01) | |
| *G01S 7/489* | (2006.01) | |
| *G01S 17/02* | (2006.01) | |
| *G01S 17/88* | (2006.01) | |
| *G01S 7/497* | (2006.01) | |
| *G01S 7/48* | (2006.01) | |
| *G01S 17/42* | (2006.01) | |
| *G01S 17/66* | (2006.01) | |
| *G01S 17/00* | (2006.01) | |

(52) U.S. Cl.
CPC ........... *G01S 7/4817* (2013.01); *G01S 7/497* (2013.01); *G01S 17/026* (2013.01); *G01S 17/10* (2013.01); *G01S 17/88* (2013.01); *G01S 17/936* (2013.01); *G01S 7/4802* (2013.01); *G01S 17/003* (2013.01); *G01S 17/42* (2013.01); *G01S 17/66* (2013.01)

(56) References Cited

U.S. PATENT DOCUMENTS

| 4,688,937 | A | 8/1987 | Konig et al. |
|---|---|---|---|
| 4,943,157 | A | 7/1990 | Reding |
| 5,231,401 | A | 7/1993 | Kaman et al. |
| 5,638,164 | A | 6/1997 | Landau |
| 5,914,826 | A | 6/1999 | Smallwood |
| 6,055,490 | A | 4/2000 | Dunne |
| 6,091,037 | A | 7/2000 | Bachschmid |
| 7,064,817 | B1 | 6/2006 | Schmitt et al. |
| 7,089,114 | B1* | 8/2006 | Huang .................. B60T 7/22 340/435 |
| 7,299,892 | B2 | 11/2007 | Radu |
| 7,446,733 | B1 | 11/2008 | Hilt-Nal |
| 7,608,948 | B2 | 10/2009 | Nearhoof |
| 8,666,104 | B2 | 3/2014 | Ivey |
| 8,675,887 | B2 | 3/2014 | Yuan |
| 8,786,835 | B1 | 7/2014 | Reardon et al. |
| 8,878,901 | B2 | 11/2014 | Meinherz |
| 8,948,591 | B2 | 2/2015 | Scherbarth |
| 9,002,511 | B1 | 4/2015 | Hickerson et al. |
| 9,069,059 | B2 | 6/2015 | Vogt et al. |
| 9,097,800 | B1 | 8/2015 | Zhu |
| 9,121,703 | B1 | 9/2015 | Droz et al. |
| 9,128,190 | B1 | 9/2015 | Ulrich et al. |
| 9,199,643 | B1 | 12/2015 | Zeng |
| 9,279,796 | B1 | 3/2016 | Weisberg et al. |
| 9,285,477 | B1 | 3/2016 | Smith et al. |
| 9,383,753 | B1 | 7/2016 | Templeton et al. |
| 9,625,582 | B2 | 4/2017 | Gruver et al. |
| 2005/0057741 | A1 | 3/2005 | Anderson et al. |
| 2005/0237218 | A1 | 10/2005 | Tang |
| 2006/0104585 | A1 | 5/2006 | Cho |
| 2006/0161270 | A1 | 7/2006 | Luskin |
| 2007/0024841 | A1 | 2/2007 | Kioza |
| 2007/0289860 | A1 | 12/2007 | Newman |
| 2008/0068584 | A1 | 3/2008 | Mori et al. |
| 2009/0147239 | A1 | 6/2009 | Zhu et al. |
| 2009/0219962 | A1 | 9/2009 | Meyer et al. |
| 2009/0273770 | A1 | 11/2009 | Bauhahn et al. |
| 2011/0181201 | A1 | 7/2011 | Hollis |
| 2013/0222791 | A1 | 8/2013 | Steffey et al. |
| 2014/0270237 | A1 | 9/2014 | Wang |
| 2014/0270264 | A1 | 9/2014 | Wang |
| 2014/0350836 | A1 | 11/2014 | Stettner et al. |
| 2015/0185246 | A1 | 7/2015 | Dakin et al. |
| 2015/0192677 | A1 | 7/2015 | Yu et al. |
| 2015/0247703 | A1 | 9/2015 | Teetzel et al. |
| 2015/0286340 | A1 | 10/2015 | Send et al. |
| 2015/0307020 | A1 | 10/2015 | Salter et al. |
| 2016/0047896 | A1 | 2/2016 | Dussan |
| 2016/0282468 | A1 | 9/2016 | Gruver et al. |
| 2017/0169703 | A1 | 6/2017 | Carrasco et al. |
| 2017/0176990 | A1* | 6/2017 | Keller .................... G01S 17/42 |
| 2018/0059248 | A1 | 3/2018 | O'Keeffe |
| 2018/0074175 | A1 | 3/2018 | O'Keeffe |
| 2018/0095175 | A1 | 4/2018 | O'Keeffe |
| 2018/0100929 | A1 | 4/2018 | O'Keeffe |
| 2018/0106890 | A1 | 4/2018 | O'Keeffe |
| 2018/0120440 | A1 | 5/2018 | O'Keeffe |
| 2018/0156896 | A1 | 6/2018 | O'Keeffe |

OTHER PUBLICATIONS

Vojnovic; Notes on optical fibres and fibre bundles; Gray Institute, Department of Oncology, University of Oxford; 15 pages; retrieved from the internet ( http://users.ox.ac.uk/-atdgroup/referencematerial/Notes%20on%20optical%20fibres%20and%fibre%20bundels.pdf); (year of pub. sufficiently earlier than effective US filing date and any foreign priority date) 2012.

* cited by examiner

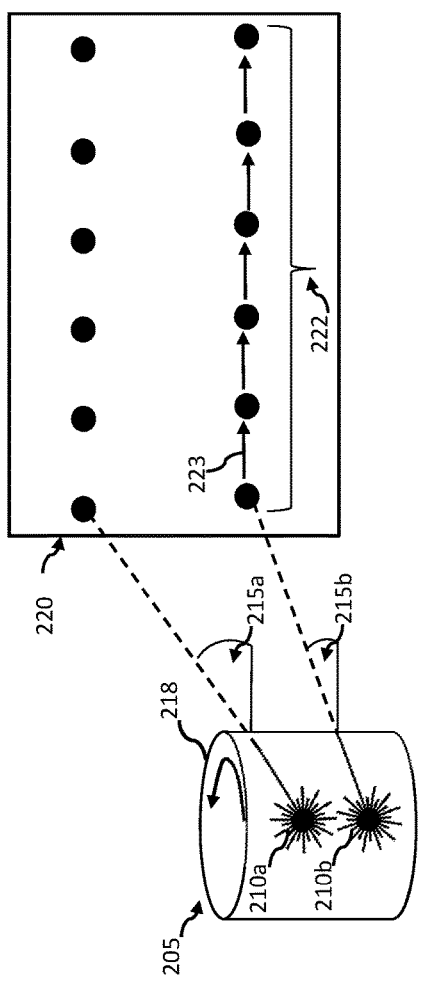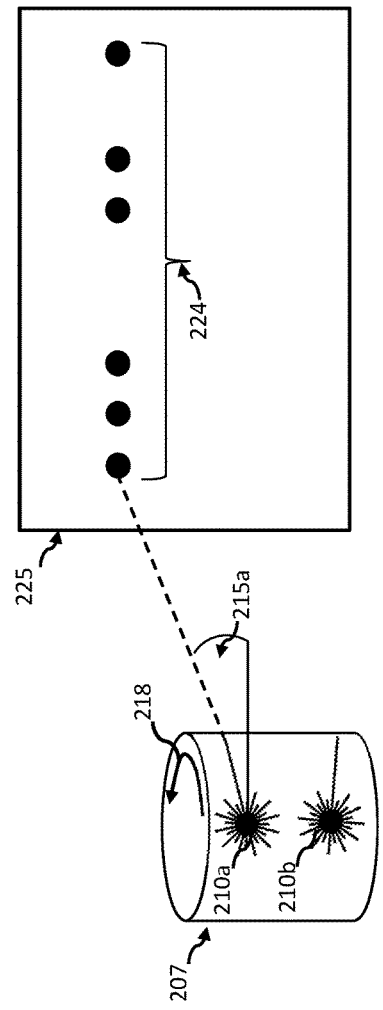
FIG. 2A
FIG. 2B

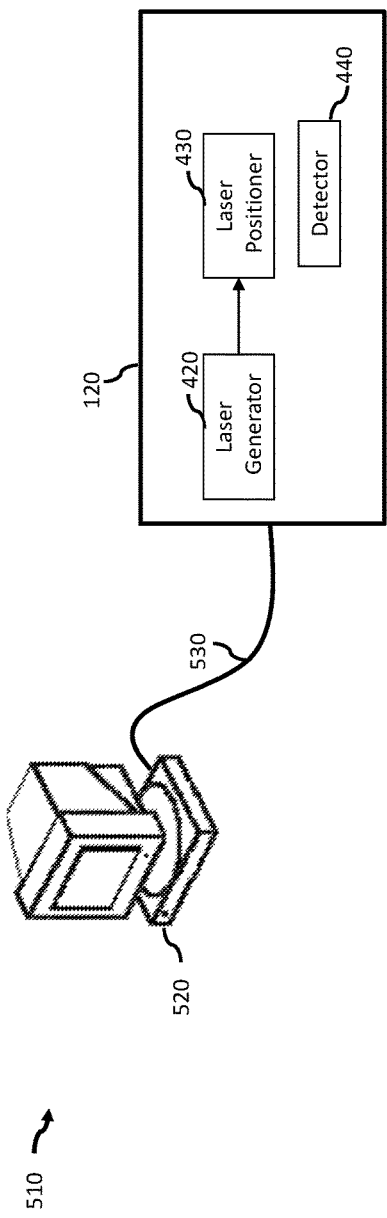
FIG.5A
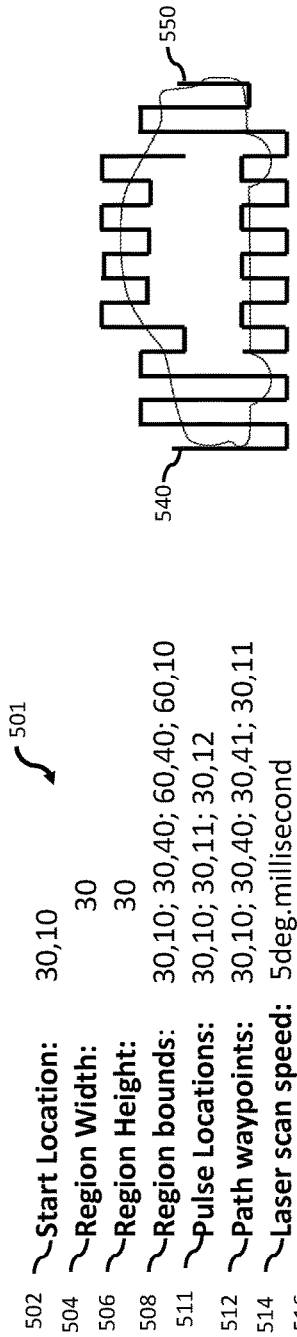
FIG. 5C
| | | |
|---|---|---|
| 502 | Start Location: | 30,10 |
| 504 | Region Width: | 30 |
| 506 | Region Height: | 30 |
| 508 | Region bounds: | 30,10; 30,40; 60,40; 60,10 |
| 511 | Pulse Locations: | 30,10; 30,11; 30,12 |
| 512 | Path waypoints: | 30,10; 30,40; 30,41; 30,11 |
| 514 | Laser scan speed: | 5deg.millisecond |
| 516 | Laser pulse size: | 10mm, 4mm |
| 518 | Number of Pulses: 300 | |
FIG. 5B

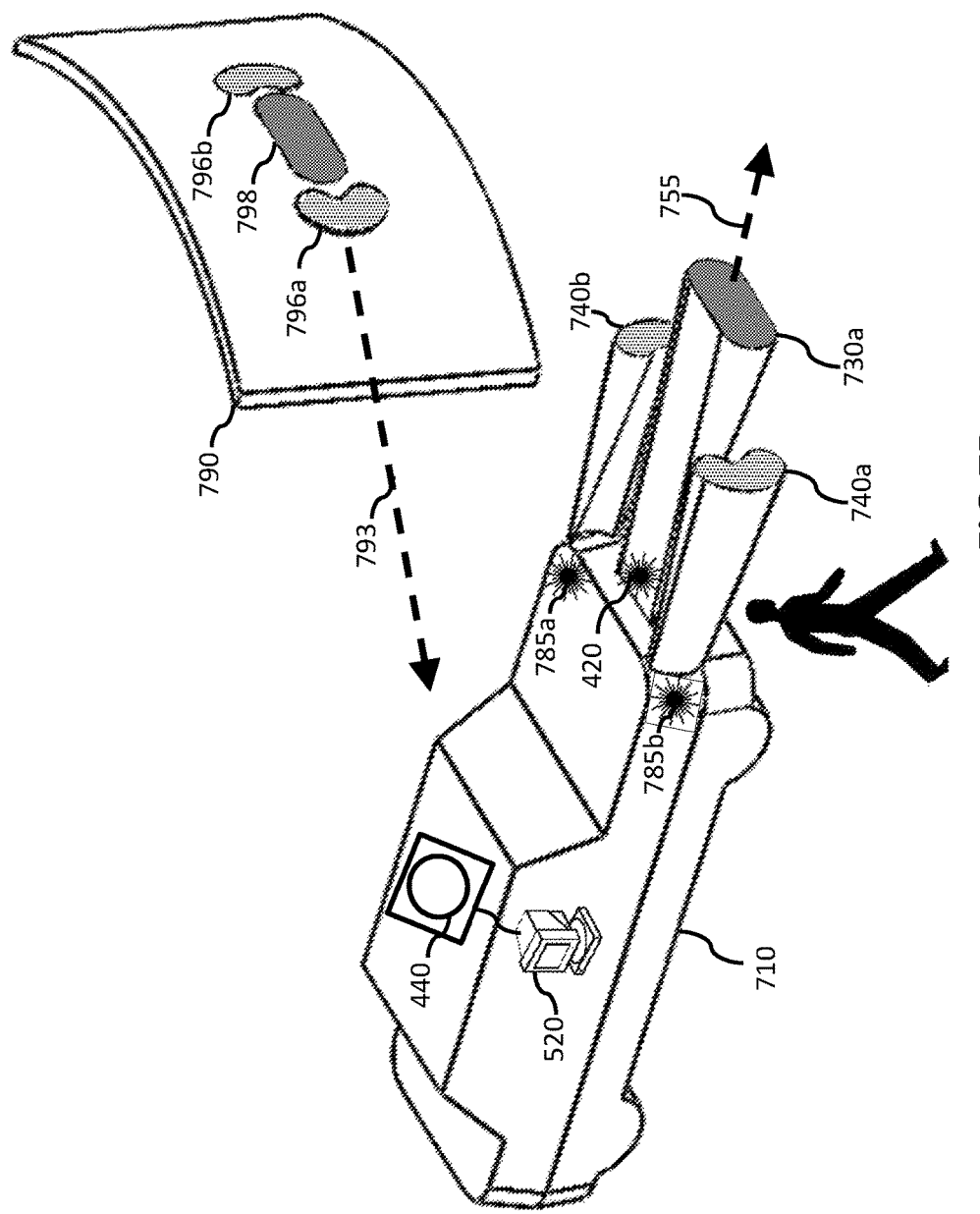

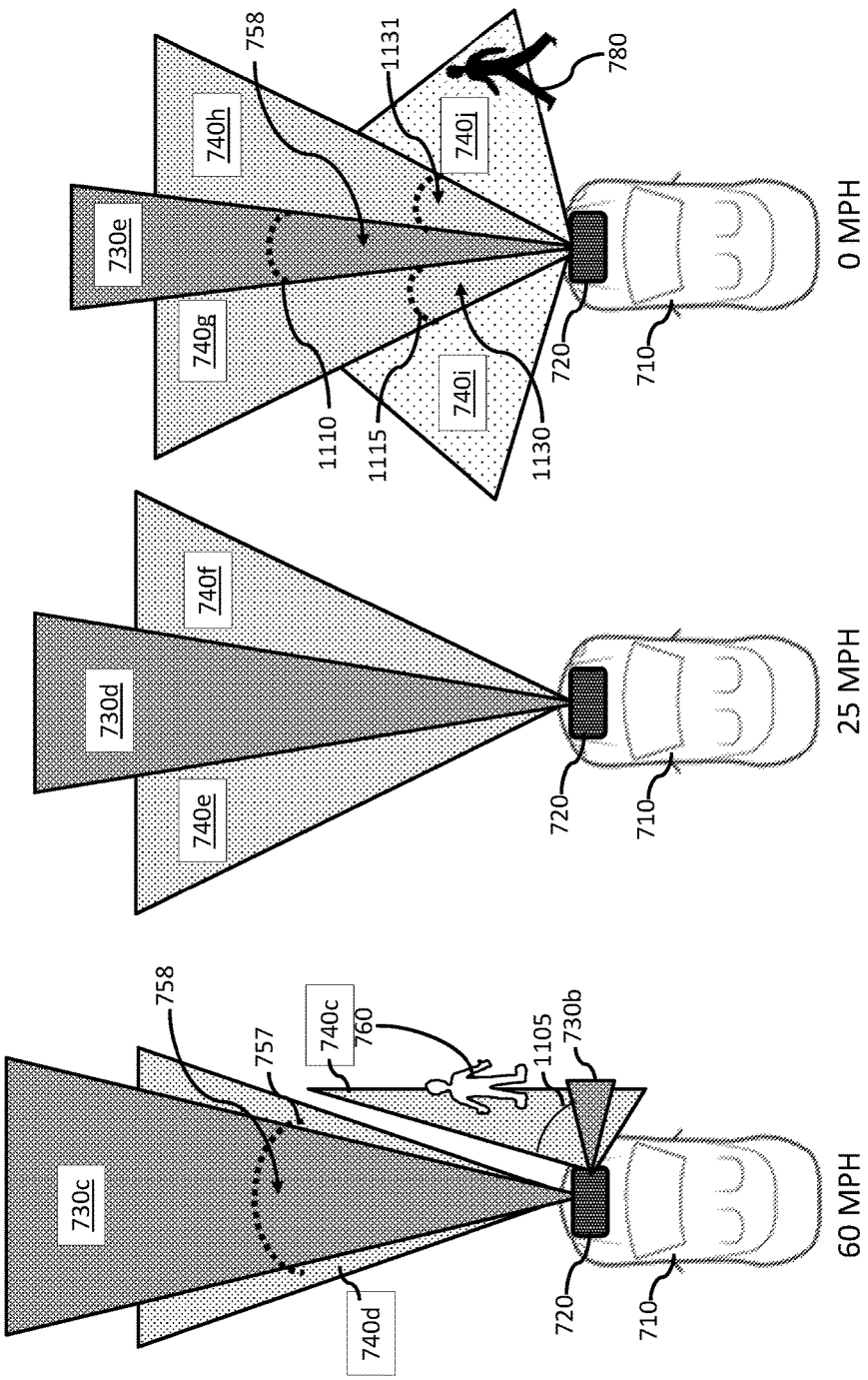

LIDAR WITH SMART SAFETY-CONSCIOUS LASER INTENSITY

CROSS-REFERENCE TO RELATED APPLICATIONS

This application is a continuation of International Application No. PCT/US17/49231, filed Aug. 29, 2017, which claims the benefit of priority to of U.S. provisional patent application Ser. No. 62/380,951, filed on Aug. 29, 2016.

BACKGROUND

Laser light poses several safety risks to humans, based on the coherent nature of laser radiation. The potential for eye damage is often the modality that requires the most stringent limits on laser power. In controlled environments (e.g. a laboratory) precautions can be used such as protective eyewear or housing a laser in a specialized enclosure with safety interlocks. In open environments (e.g. streets and highways) such precautions cannot be assumed and hence eye-safety is often ensured by using inherently eye-safe lasers (e.g. ANSI Z136.4 class 1 lasers).

Laser range finding is a useful technology for autonomous vehicles but must operate safely in human-filled environments. Maximum measurement range can benefit from higher laser intensity. However, many countries and regions of the world impose varying limits on the maximum permissible laser radiation (e.g. energy per square centimeter or energy per pulse). Traditionally, adherence to these laser radiation limits is ensured by design and validated during the laser system qualification. This designed-in approach to limiting laser radiation exposure is conservative and often suboptimal. Recent, alternative approaches attempt to sense objects in the vicinity of a laser that is operating above an intrinsically safe (e.g. eye-safe) threshold. The intensity of a laser beam can decrease as it travels from a source and hence it may only be necessary to monitor for objects (e.g. people) within a threshold distance from the source to ensure safe laser operation. U.S. Pat. No. 9,121,703 issued to Droz discloses using a proximity sensor to sense an object within a threshold distance of the laser range finder and discontinuing laser emission upon detection. Proximity sensors (e.g. passive infrared sensors) are useful for identifying objects in the vicinity but provide little specificity regarding location and the path or trajectory of objects in the field of view (FOV) of the laser system. Proximity-based laser-deactivation can be useful when a laser system emits high-intensity laser light in a wide range of azimuthal directions (e.g. 360 degrees) but can be overly-conservative (e.g. produce many false positives) for a laser system that emits high-intensity pulses in only a narrow range of directions.

U.S. Pat. No. 8,948,591 to Scherbarth discloses a laser range finder that detects objects within a threshold distance during some previous time period and discontinues laser emission upon detecting an object within the threshold distance. This approach does not address the challenge of high-intensity laser pulses during the discovery of a new object within the threshold distance. Several safety standards (e.g. ANSI Z136.4) require all laser pulses meet an eye-safe intensity requirement, even a single laser pulse during discovery of a new object.

Therefore, an ongoing technical challenge is the operation of a laser range finder in a high-intensity mode while ensuring safety and avoiding frequent false positive laser power reductions.

SUMMARY

Within examples, devices, systems and methods for controlling laser power or intensity in various regions of the FOV of a laser range finder are provided. In one example, a method generates high-intensity laser pulses (e.g. above an eye-safe intensity threshold) in a well-defined adaptive-intensity region of a FOV of a laser range finder. The method surrounds the adaptive-intensity region with a protective guard-region of the FOV (e.g. a guard-ring) of lower intensity (e.g. eye-safe intensity) laser pulses. A detector can detect laser reflections from the lower intensity laser pulses in the guard region and in response to sensing an object in the guard region, or entering the guard region within a threshold distance the laser range finder can subsequently reduce the intensity of laser pulses (e.g. to an eye safe intensity) within the adaptive-intensity region. The guard region can act as a safety feature, using low-intensity laser pulses to provide early and spatially accurate warning of objects likely to intersect the path of the high-intensity laser pulses thereby enabling intensity reduction.

In another example, a non-transitory computer readable storage medium having stored therein instructions that when executed by a computer device, cause the computing device to perform functions. The functions comprise dynamically steering with a steerable laser assembly at least one laser beam and thereby generating a first set of laser pulses in an adaptive-intensity region of a FOV, each with an intensity above a threshold intensity, and a second set of laser pulses in a guard region of the FOV, each with an intensity below the threshold intensity. The functions further comprise directing, based on the dynamic steering of the laser beam, the second set of laser pulses such that the guard-region adjoins or encloses at least some of the perimeter of the adaptive-intensity region. The functions can position the guard region such that a plurality of straight line paths in the plane of the FOV that enter the FOV from an edge and intersect the adaptive-intensity region, must first traverse the guard-region, thereby providing forewarning of objects (e.g. pedestrians) likely to enter the adaptive-intensity region. The functions also comprise detecting with detector a set of laser reflections corresponding to the second set of laser pulses. The function also comprise, in response to sensing a first object in the guard region, based at least in part on the set of laser reflections, generating a third set of laser pulses in the adaptive-intensity region each with an intensity below the threshold intensity.

The guard region can serve to detect objects approaching the adaptive-intensity region of the FOV and trigger the laser range finder to reduce the intensity upon detection of an object in the guard region. In one aspect, the laser pulses in the adaptive-intensity region of the FOV can be attenuated (e.g. generated at an eye-safe intensity) in response to detecting and object in the guard-region. In another aspect, a safety test can be evaluated on objects in the guard region (e.g. a criterion that determines whether an object is on a trajectory that will soon intersect the adaptive-intensity region) and the intensity of laser pulses in the adaptive-intensity region can be based on the result of the safety test. Therefore, in one embodiment the present disclosure provides a benefit over systems that discontinue or attenuate laser power in a region when an object is sensed in that region, by instead using a trajectory measured in a defined guard region to control intensity in an adaptive-intensity region. The guard region can be adjoining the adaptive-intensity region and the measured trajectory of an object can indicate imminent intrusion into the adaptive-intensity region.

In another aspect, some of the laser reflections in the guard region can come from known sources (e.g. trees or a portion of a vehicle that is always in the FOV). In one embodiment a method can define one or more mask regions of the FOV whereby reflections from objects in the mask regions are discounted in the process of evaluating a safety test on reflections from the guard region of the FOV in the process of determining the intensity of future laser pulses in the adaptive-intensity region of the FOV.

In a related group of embodiments a laser range finder can receive location estimates for a set of objects in a FOV. The laser range finder can obtain an age associated with each location estimate (e.g. the time elapsed since laser reflections associated with an object location estimate). The laser range finder can determine an object region (e.g. a portion of the FOV or a volume of space) associated with the object at a later time, based at least in part on the age of the location estimate and the position of the location estimate. The laser range finder can generate one or more laser pulses with intensities based on the object regions for the objects. For example, an object in the guard region of the FOV (e.g. a pedestrian) and moving towards the adaptive-intensity region at a slow rate of speed can cause the laser range finder to reduce intensity in the adaptive-intensity region. Conversely, a slow moving pedestrian some distance away (e.g. 100 m) may generate a much smaller object region in the FOV (e.g. angular region at some later time) and thereby not pose an imminent threat of entering or intersecting the path of high intensity laser pulses in an adaptive-intensity region of the FOV. In this case, the laser range finder can generate high-intensity laser pulses, based on the location estimate and the estimate age (e.g. the estimate is 0.5 seconds old).

ADVANTAGES

The techniques described in this specification can be implemented to achieve the following exemplary advantages:

With the advent of solid-state laser range finders with low azimuthal range (e.g. 90-120 degrees) the danger of high-intensity laser pulses is often confined to a threshold distance in a narrow range of angles. Aspects of the present disclosure provide improved accuracy and timeliness of detecting future intrusion into the path of high-intensity laser pulses. The disclosed laser range finder can improve laser safety by using eye-safe intensity guard pulses in dedicated strategically placed guard regions of a FOV to trigger intensity reduction in neighboring adaptive-intensity regions before an object has a chance to reach the adaptive-intensity region. In another advantage the disclosed systems can use low intensity laser pulses to discover objects, thereby maintaining compliance with safety requirements.

In a related area, a laser range finder can use machine learning to discover common intrusion paths into high intensity laser beams and can subsequently generate guard regions around these path, thereby making the high-intensity laser pulses contingent on analysis of common intrusion paths. In another advantage, the disclosed laser range finder can dynamically steer a laser beam to monitor guard regions first during a scan of the FOV before subsequently generating high intensity laser pulses.

Previous high-intensity laser systems must react quickly to objects to avoid damage caused by the laser intensity. The disclosed laser range finder provides increased reaction time using lower-intensity laser pulses to determine if an object is likely to intersect with high-intensity laser pulses, thereby reducing the number of false positive intensity reductions in the adaptive-intensity regions.

Embodiments of the present disclosure provide the further advantage of enabling analysis of the trajectory of objects in the guard region using lower intensity (e.g. eye-safe) laser pulses. In a related advantage the number of false positive intensity reductions is further reduced by using trajectory determination of objects in the guard region. In one embodiment, the trajectory of an object in the guard region can be safely measured using lower-intensity laser pulses and used to determine the intensity of laser pulses in the adaptive-intensity region. This is advantageous because as an autonomous vehicle with a laser range finder moves down an urban street the majority of pedestrians (e.g. on a sidewalk) enter the FOV at a far distance in the center of the FOV and proceed to move away to the edge as they approach the vehicle. This effect is similar to how stars in science fiction movies (e.g. Start Trek) or stars in video games (e.g. Galaga by NAMCO Inc.) tend to move from the center of the FOV to the sides due to the motion of the observing platform (e.g. the space ship). For this reason, as an autonomous vehicle moves the majority of pedestrians appear to move along a path from the middle of the FOV at far distances (e.g. 100 m) to the edge as they approach the autonomous vehicle. The disclosed embodiments provide a greater reaction time to determine if objects are moving in a typical manner and react accordingly.

In a related advantage, several embodiments provide for adapting the size, intensity and location of guard regions to adapt to different driving conditions. For example, a vehicle stopped at a crosswalk can implement wide guard regions with very low intensity, since the primary danger is a person walking in front of the vehicle. At high speeds guard regions can be narrowed and extended in range to protect people as the vehicle turn.

DRAWINGS

FIG. 2A illustrates a uniformly steered rotating LIDAR generating a sequence of laser pulses in a field of view.

FIG. 2B-2F illustrate dynamically steered LIDARs generating a variety of non-uniformly distributed sequences of laser pulses, according to embodiments of the present disclosure.

FIG. 5A illustrates an exemplary laser range finding system including a processing subassembly and a steerable laser assembly connected by a communication link, according to an embodiment of the present disclosure.

FIGS. 5B and 5C illustrate exemplary laser steering parameters according to an aspect of the technology.

FIG. 7B is an exemplary bistatic laser range finder system for generating high-intensity laser pulses surrounded and controlled by aspects of guarding laser pulses according to an embodiment of the present disclosure.

FIGS. 11A, 11B, 11C, 11D, 11E and 11F illustrate exemplary zones of high-intensity laser pulses and guard laser pulses based on the speed of a vehicle, in accordance with an embodiment of the present disclosure.

DETAILED DESCRIPTION

Figure 1A:
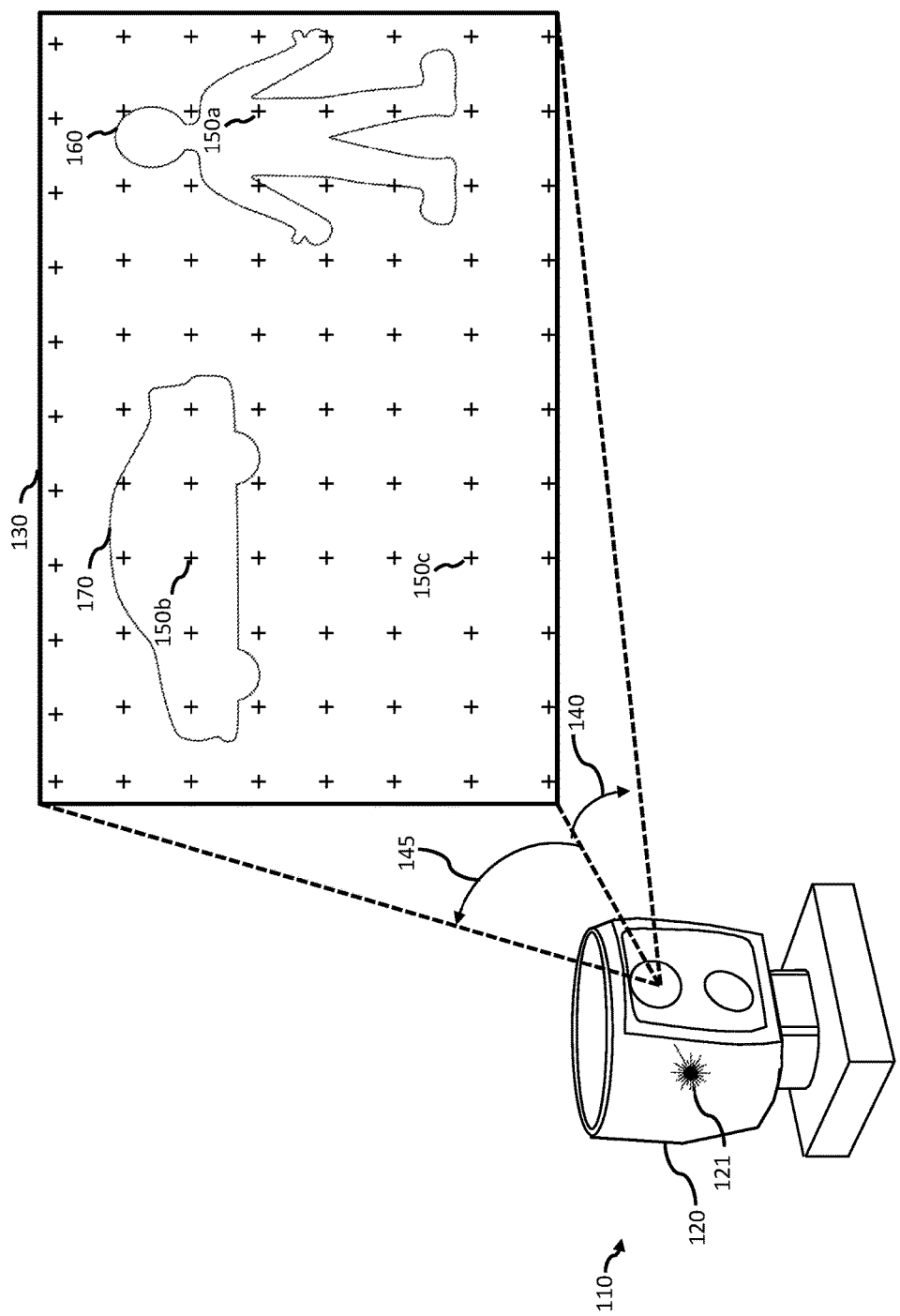
FIGS. 1A and 1B are exemplary diagrams of a laser range finder and a plurality of laser pulse locations in a field of view, according to an embodiment of the present disclosure.

Unlike digital cameras where light is received form many points at once, a laser range finder can rely on a relatively small number of laser beams (e.g. 1-64) aimed sequentially at a number of points (e.g. 100,000) during each scan of the FOV. Hence, the measurement density of laser ranging systems is often much lower than digital cameras. The laser pulses represent a scarce resource and the FOV is often undersampled with respect to sensing detailed boundaries or changes in topology. For example, a tree in the field of view could be scanned with 1000 points during a scan of the FOV and the same tree could occupy one million pixels in a digital camera image. For the purpose of this disclosure the FOV of a laser transmitter is the set of all directions in which the laser transmitter can emit a laser light. For the purpose of this the FOV of a detector (e.g. a photodetector) is the set of all directions along which the detector can detect light (e.g. a laser pulse). The FOV of a laser range finder is set of all directions in which the laser range finder can perform laser range finding (e.g. the set of all directions in which the laser range finder can both transmit and receive laser light). For the purpose of this disclosure a single scan of a FOV by a laser range finder is the process of performing laser ranging measurements in the largest substantially unique set of directions (e.g. the longest sequence of directions that does not repeat or cover a substantially similar portion of the FOV). In a simple example, a rotating laser range finder may scan the FOV by performing a 360 degree revolution. A raster scanning laser range finder may scan he FOV by performing 10 left to right sweeps of a FOV and changing the elevation angle of the a laser generator after each sweep to cover the entire FOV.

Steerable Laser Assembly

LIDARs often provide laser ranging in a plurality of directions (e.g. a FOV) and thereby generate data for a 3D topology map of the surroundings. To accomplish this LIDAR can have a steerable laser assembly. For the purpose of this disclosure a steerable laser assembly is an assembly that scans one or more laser beam within a FOV. A steerable laser assembly can include a laser generator (e.g. a laser diode) and a laser positioner (e.g. a rotating scanning mirror) to position the laser beam in a variety of directions in during a scan of the FOV. The steerable laser assembly can be mechanically-steerable (e.g. containing moving parts to direct a laser beam) or electronically-steerable (e.g. containing an optical phased array to form a laser beam at in one of many directions).

Many LIDARs have a mechanically steerable laser assembly that rotates with a constant angular velocity and thereby scans the FOV with uniform measurement spacing (e.g. 1 laser pulse and 1 measurement for every 1 degree of the azimuthal FOV). The pattern of generated laser pulses is uniform and largely determined by the angular velocity of the rotating components. The angular velocity can be selected for many mechanical LIDAR (e.g. 5-20 Hz for the HDL-64E from Velodyne Inc. or Morgan Hill, Calif.), but remains constant (or nearly constant) from one rotation to the next. The uniform angular spacing of laser pulses within the FOV is simple and somewhat inherent in rotating LIDARs, but is sub-optimal for gathering the most information from the FOV. For example, large sections of the FOV can return a predictable, time-invariant, homogeneous response, such as reflections from walls or unoccupied sections of a highway.

Dynamically Steerable Laser Assembly

In a mechanical LIDAR the inertia of the spinning components prevents rapid changes in the angular velocity that would be necessary to dynamically steer a laser beam to produce a complex non-uniform and dynamically defined patterns of laser pulses. Recently, advancements in electronically-steerable lasers and phased array laser beam forming have made it possible to dynamically steer a laser beam within a FOV. Electronically-scanned LIDAR are solid-state and comprise no moving parts (e.g. the model S3 from Quanergy Inc. of Sunnyvale, Calif.). In a solid state LIDAR, the absence of inertia associated with moving parts makes it possible to move a laser beam along a complex trajectory thereby producing a series of laser pulses with non-uniform spacing, density, and location in the FOV.

For the purpose of this disclosure, a dynamically steerable laser assemblies are a subset of steerable laser assemblies wherein the assembly can dynamically steer one or more laser beams by accepting inputs (e.g. user commands) and thereby dynamically change aspects of the laser beam such as beam power, spot size, intensity, pulse repetition frequency, beam divergence, scan rate or trajectory. A dynamically steerable laser assembly can change aspects of one or more laser beams several times during a scan of the FOV. For example, a differentiating aspect of many dynamically steerable laser assemblies over traditional laser assemblies is circuitry operable to process instructions while the laser beam scans the FOV and continually adjust the direction of a laser beam. This is similar to the dynamic manner in which a 3D printer dynamically rasters a polymer filament to print an arbitrary shaped object. A traditional mechanically steered LIDAR, with associated inertia, can only implement small changes in angular velocity during each scan (e.g. changing from 20 Hz to 20.5 Hz scan rate in the course of a single 360 degree rotation). In contrast, it can be appreciated that a dynamically steerable LIDAR can make several changes to aspects of the laser pulse pattern in the course of a single scan of the FOV (e.g. rapidly changing the trajectory of a laser beam by 90 degrees within 10 milliseconds or tracing the outline of a complex shape with many turns during a single scan).

For the purpose of this disclosure, dynamically steering a laser beam with a steerable laser assembly is a process of providing input data to the steerable laser assembly that causes the steerable laser assembly to dynamically modulate at least one aspect of the resulting laser pulse sequence during a scan of the FOV. Exemplary modulated aspects can include the beam or pulse power, spot-size, intensity, pulse repetition frequency (PRF), beam divergence, scan rate or trajectory of the laser beam. For example, a laser assembly that is designed to raster scan a FOV with a constant scan rate and pulse rate (e.g. PRF) is acting as a steerable laser assembly but is not being dynamically steered. The distinction is that such a laser assembly is not receiving input or acting on previous input and dynamically altering aspects of the beam pattern during the course of each scan of the FOV. However, the same steerable laser assembly could be dynamically steered by providing input signals that cause the steerable laser assembly to generate a variable laser power at locations in the FOV, based on the input signals (e.g. thereby generating an image on a surface in the FOV). A trajectory change can be a direction change (i.e. a direction formed by a plurality of pulses) or a speed or scan rate change (i.e. how fast the laser is progressing in a single direction across the FOV). For example, dynamically steering a steerable laser assembly can be dynamically changing the angular velocity, thereby causes the inter-pulse spacing to increase or decrease and generating a dynamically laser pulse density. In one aspect, dynamic steering can often be recognized as the process of implementing dynamic control of a laser pulse pattern during a scan of a FOV.

In the context of the present disclosure, many rotating LIDAR do comprise steerable laser assemblies, but these assemblies are not dynamically steerable since neither the power nor the trajectory of the laser beam is dynamically controllable within a single scan of the FOV. However, a rotating or mechanical LIDAR could be dynamically steered, for example, by providing input data that causes the laser to dynamically vary the laser pulse rate within a scan of the FOV, since the net result is a system that can guide or steer the laser to produce a non-uniform density laser pulse pattern in particular parts of the FOV.

In many laser range finders the laser is periodically pulsed as the laser assembly moves along a trajectory and the exact location of each laser pulse in the FOV is controlled. Nevertheless such a periodically pulses laser generator can be used in a steerable laser assembly to produce a complex shaped region with greater than average spatial density pulse density, For example, by increasing the laser dwell time within the complex shaped region. In this way, a periodically pulsed laser generator (e.g. a laser diode) can produce a greater density of pulses in the complex shaped region. Other laser range finding systems transmit a continuous laser signal, and ranging is carried out by modulating and detecting changes in the intensity of the laser light. In a continuous laser beam systems the distance to a reflection location can be determined based on the phase difference between the received and transmitted laser signals.

In one aspect, a dynamically steered laser range finder can be used to mine the FOV for the boundaries. For example, a LIDAR can generate laser pulses with a 3 milliradian beam divergence, thereby resulting in a 2 cm by 2 cm laser spot size at a distance of 200 m. This small laser spot size enables the LIDAR to identify the boundaries of an object at 200 m. In many cases the resolution of objects at considerable range is limited by the number of pulses devoted to an object rather than the ability of each pulse to identify a boundary. Therefore, once a boundary is detected a dynamically steerable laser assembly could be dynamically steered to investigate and refine estimates of the boundary by devoting more pulses to the object. In contrast, RADAR has much greater beam divergence and hence a much wider spot size impacts the object (often many times the object size). Hence, the reflections from beam-steered RADAR represent the reflections from many points on the object, thereby making beam steered RADAR useful for object detection but impractical for detailed boundary determination or localization. Hence, in a RADAR a small change in beam angle provides little if any actionable information regarding the edges of an object. In contrast the spot size of the laser remains small relative to the boundary of many important objects (people, dogs, curbs). The present technology enables the boundaries of such objects to be dynamically determined by a process of iteratively refining the scan points for the electronically steered LIDAR. For example, a LIDAR with dynamic steering could use a bisection algorithm approach to iteratively search for the boundary of a pedestrian in the FOV. The LIDAR could first process laser reflection data to identify that a 3D point P1 in the point cloud has a TOF consistent with the pedestrian and can subsequently scan iteratively to the right and left of P1 with decreasing angular range (e.g. in a bisection approach) to estimate the exact location of the boundary between the pedestrian and the surrounding environment. In general, this technique can be used to investigate changes in range (e.g. time of flight changes) within a point cloud to iteratively improve boundary definition or boundary location estimates.

FIG. 1A illustrates a laser range finder system 110 (e.g. a LIDAR) that comprises a steerable laser assembly 120. Steerable laser assembly 120 scans one or more lasers (e.g. steerable laser 121) within a field of view FOV 130. The field of view 130 can be defined by an azimuthal (e.g. horizontal) angular range 140 and an elevation (e.g. vertical) angular range 145. Steerable laser 121 scans FOV 130 and generates a plurality or sequence of laser pulses, (e.g. laser pulses 150*a*, 150*b* and 150*c*) in a sequence of directions. The direction in the FOV of the each of the plurality of laser pulses is illustrated with a "+" symbol. Some of the laser pulses (e.g. 150*a* and 150*b*) can be reflected by objects (e.g. person 160 and vehicle 170). In the embodiment of FIG. 1A the laser pulses are evenly spaced in the FOV, such that the angular separation between neighboring laser pulses is a constant value in one or both of the horizontal and vertical directions. Accordingly, only a few of the laser pulses (e.g. 5-6 pulses) reflect from each of the objects 160 and 170 due in part to the uniform laser pulse density throughout the FOV. For the purpose of this disclosure the FOV of laser range finder 110 can be defined as the set of all directions (e.g. combinations of elevation and azimuthal angles) in which the laser range finder can perform laser ranging measurements.

Figure 1B:
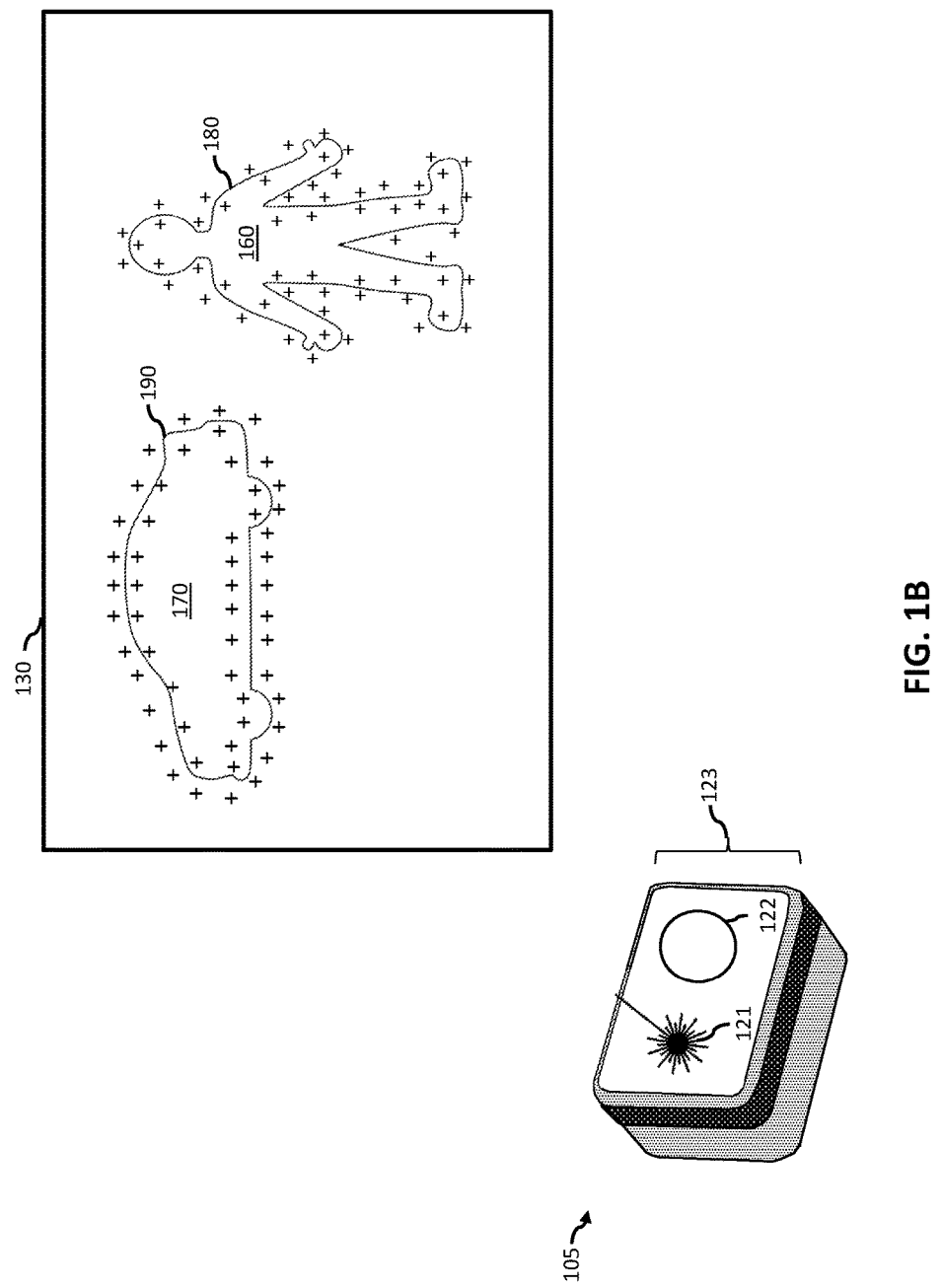

FIG. 1B illustrates a laser range finder 105, with a steerable laser assembly 123, comprising a steerable laser 121 and a laser detector 122 in the same FOV 130 to generate approximately the same number of laser pulses. In the example of FIG. 1B the steerable laser is dynamically steered (instead of uniformly or non-dynamically steered) to generate a non-uniform high laser pulse density pattern surrounding the boundaries 180 and 190 or person 160 and vehicle 170 respectively. Steerable laser assembly 123 is an example of a dynamically-steerable laser assembly and can comprise circuitry to dynamically accept instructions (e.g. laser steering parameters) and configure laser 121 to rapidly change direction or pulse rate of a laser beam. Several embodiments of the present technology provide for using laser steering parameters to dynamically steer, guide, instruct or configure a steerable laser (e.g. an electronically steerable laser) to generate regions of increased laser pulse density or non-uniform pulse density. Laser range finder 105 can further comprise a laser detector 122 to detect reflections from laser pulses.

FIG. 2A illustrates some of the features and characteristics of a rotating LIDAR that is not dynamically steered (e.g. the HDL-64e from Velodyne Inc. or Morgan Hill, Calif.). Rotating LIDAR 205 has two lasers 210a and 210b each having a fixed corresponding elevation angle 215a and 215b. The lasers are mechanically rotated in azimuthal direction 218 (i.e. sweeps the azimuthal angle from 0-360 degrees). Lasers 210a and 210b rotate at a constant angular velocity and have a constant pulse rate. Each laser thereby produces a corresponding uniformly spaced sequence of laser pulses (e.g. sequence 222) with a constant elevation angle. The lasers proceed across FOV 220 in a predictable manner with each laser pulse in a sequence having a direction that is separated from the immediately previous laser pulse by a constant angular separation in the azimuthal plane. In particular, the lasers are not reconfigured during each scan to dynamically vary either the angular velocity or the pulse rate. For example, each laser pulse in sequence 222 has a direction that can be can be uniquely defined in spherical coordinates by an elevation angle (sometimes called a polar angle) and an azimuthal angle. In the case of sequence 222 each laser pulse has a constant elevation angle 215b and uniformly spaced azimuthal angles. In the case of FIG. 2A the range of azimuthal angle separations from one laser pulse to the next (e.g. angular separation 223) is single value.

In contrast FIG. 2B illustrates a LIDAR 207 that is dynamically steered by modulating the pulse frequency of a laser while rotating the laser at a constant angular velocity. The result of configuring laser 210a to dynamically modulate the pulse frequency is a sequence of laser pulses 224 with directions in a 1-D range that are separated by varying amounts. In the case of FIG. 2B the direction separations from one laser pulse to the next (e.g. angular separation 223) have a 1-D range and hence LIDAR 207 is dynamically steered in a 1 dimension. The directions in sequence 224 span a 1-D range.

Figure 2C:
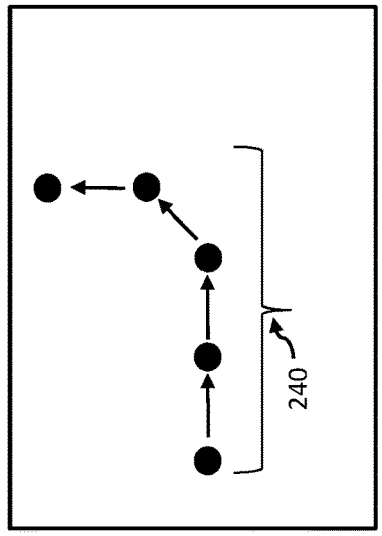

In FIG. 2C an electronically steered LIDAR 230 is dynamically steered by modulating the angular velocity of laser 235 while maintaining a constant pulse rate. The result of configuring the electronically steerable laser to dynamically modulate the angular velocity (or position of the laser in the FOV 236) is a sequence 238 of laser pulses with directions in a 1-dimensional range that are separated by varying amounts. FIG. 2C illustrates dynamically steering a laser including at least three different velocities in the course of a single sweep of the FOV including an initial nominal velocity followed by slowing down the laser trajectory to group pulses more closely and then followed by speeding up the laser to separate laser pulses by more than the nominal separation.

Figure 2D:
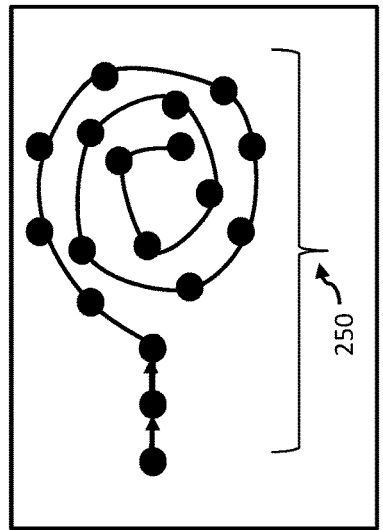

FIG. 2D illustrates dynamically steering a laser in 2 dimensions to generate a sequence of laser pulses that span a 2-D angular range. The resulting sequence has a 2-D angular range from a single laser, in contrast to a rotating LIDAR where each laser generates a sequence with a 1-dimensional angular range. A LIDAR can be configured to dynamically steer a laser to produce sequence 240 by dynamically controlling the angular velocity or position of the laser in 2 dimensions (e.g. both azimuthal and elevation). Such a sequence cannot be performed by a rotating LIDAR due in part to the angular momentum of the rotating components preventing fast modulation of the elevation angle above and below azimuthal plane.

Figure 2E:
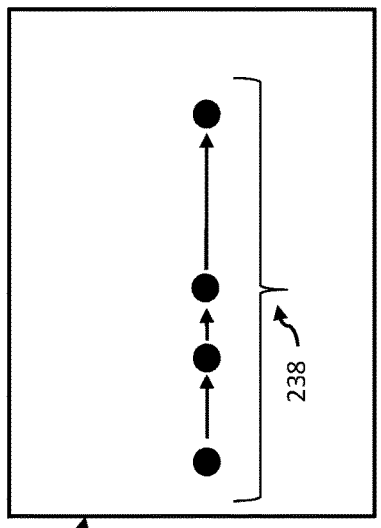

FIG. 2E illustrates dynamically steering a laser to generate a sequence of laser pulses, including several direction reversal during the sequence. For example, laser pulse sequence 242 begins by progressing the laser from left to right across the FOV 244. After laser pulse 245 the laser is reconfigured to reverse the X component of the laser direction from the positive X direction to the negative X direction. After laser pulse 246 the laser is configured to reverse direction again (i.e. back to a positive X direction). In contrast to merely modulating the speed of laser 235 in the positive X direction, direction reversals enable a dynamically steered laser to scan back and forth across a discovered boundary. In addition 2-D dynamic steering combined with direction reversal in the course of a scan of FOV 244 enables laser 235 to dynamically scan along a complex shaped boundary of an object.

Figure 2F:
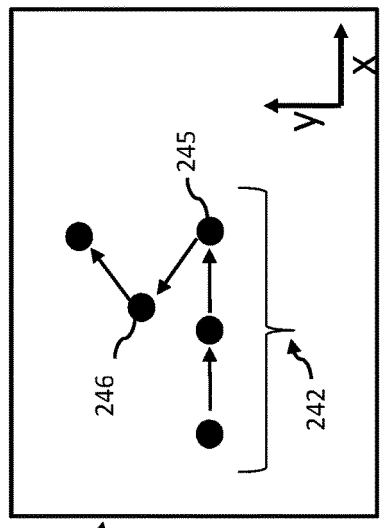

FIG. 2F illustrates dynamically steering a steerable laser (e.g. electronically steerable laser 235 in FIG. 2E) to generate a sequence of laser pulses 250 that generate a complex (e.g. spiral) shape. Complex sequence 250 is not possible with a LIDAR that is not dynamically steered (e.g. a LIDAR that that merely rotates around a single axis). One advantage of generating a complex shaped sequence with non-uniform spacing is the ability to arbitrarily determine the order in which portions of the FOV 255 are scanned. For example, sequence 250 may eventually scan a similar region with a similar density as a rotating LIDAR but has the advantage of scanning the outer perimeter first and then gradually progressing towards the center of FOV 255.

Figure 3:
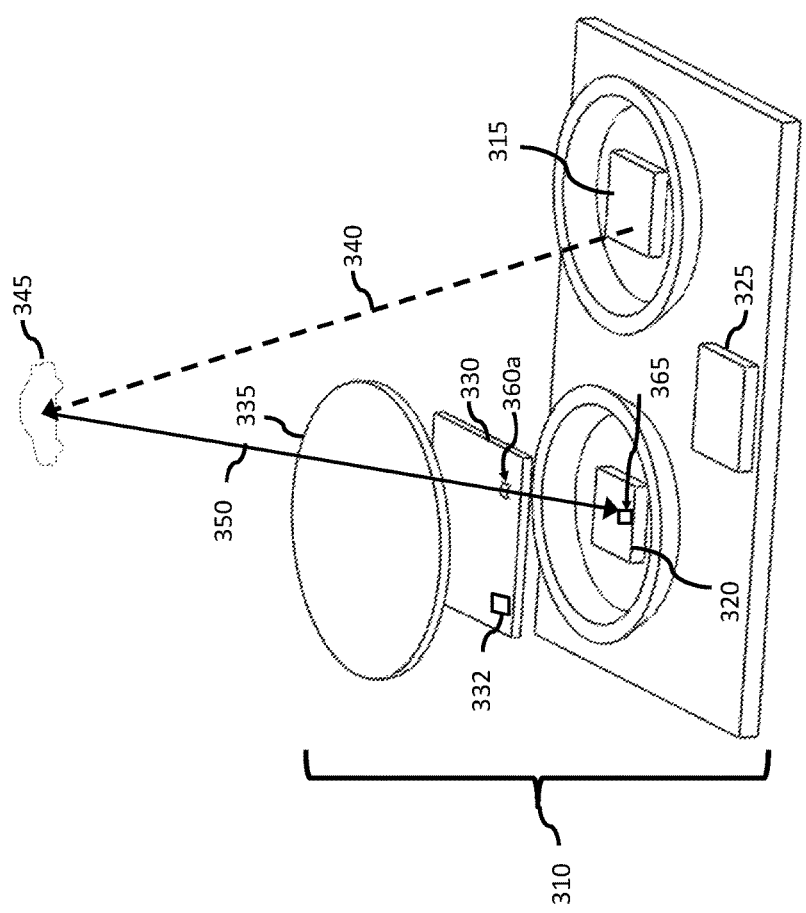
FIG. 3 illustrates several components of a solid state laser range finder, according to an embodiment of the present disclosure.

FIG. 3 illustrates some of the components of a solid-state laser range finder 310 operable to be dynamically steered. Laser range finder 310 can have a steerable laser transmitter 315, such as an optical phased array (OPA). Steerable laser transmitter 315 can comprise a laser generator to generate a set of laser pulses and a laser positioner to transmit the pulses in a set of directions in the field of view of the laser range finder. The laser positioner can comprise a laser splitter, a multimode interference coupler, an optical phase shifter (e.g. linear ohmic heating electrodes) an out of plane optical coupler to combine the split, phase-shifted beams into an output laser beam pointed in a steerable direction. Laser range finder 310 has a light detector 320 (e.g. a PIN photodiode, avalanche photodiode, a focal plane array or CCD array). The light detector can function to detect reflections (e.g. 350) from the set of laser pulses (e.g. 340) when they interact with objects in the field of view (e.g. vehicle 345). Solid state laser range finder 310 can contain a lens 335 operable to focus laser reflections onto the detector 320. Laser range finder 310 can contain control circuitry 325. Control circuitry 325 can function to receive or generate laser steering parameters indicating how the steerable laser transmitter 315 should be steered (e.g. directions, paths, or regions to scan with the laser). Control circuitry 325 can further function to generate commands or signals to the steerable laser assembly 315 instructing the steerable laser assembly to generate a continuous or pulsed laser beam in a sequence of directions.

Dynamically Steerable Laser Range Finder

Figure 4A:
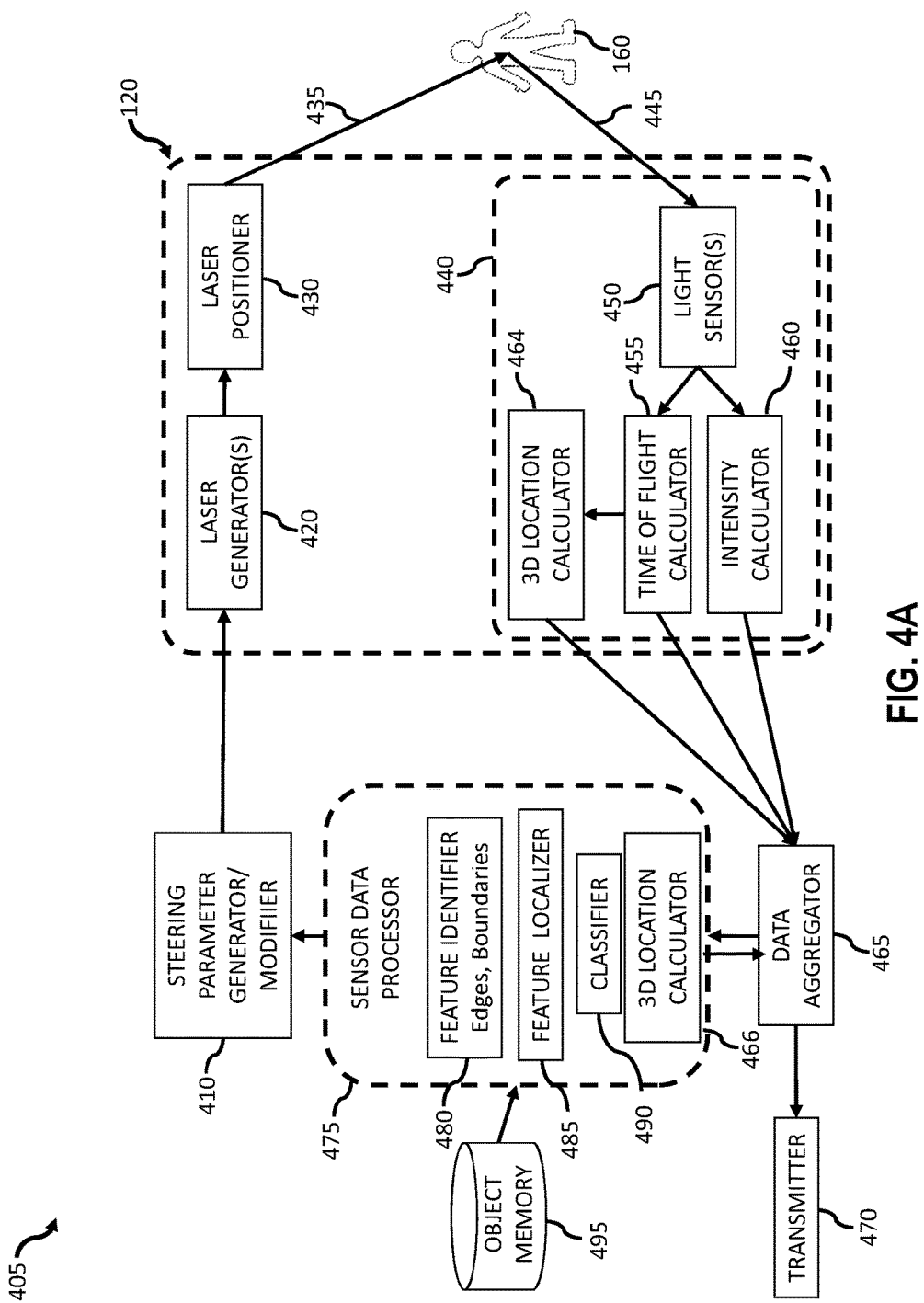
FIGS. 4A and 4B are functional diagrams illustrating several components of an exemplary dynamically steerable laser range finder in accordance with an embodiment of the present disclosure.

FIG. 4A illustrates several components of an exemplary laser range finder 405 operable to be dynamically steered in accordance with an embodiment of this disclosure. Laser range finder 405 can contain a steerable laser assembly 120 or a steerable laser transmitter 315 in FIG. 3. Laser range finder 405 can contain a laser steering parameter generator 410 to generate laser steering parameters based on processed sensor data from sensor data processor 475. Laser steering parameter generator 410 can function to generate laser steering parameters (e.g. instructions) and transmit the parameters to the steerable laser assembly 120. Laser steering parameter generator 410 can transmit the parameters in a timed manner, such that upon receiving each laser steering parameter the steerable laser assembly 120 executes or reacts to the laser steering parameter. Alternatively, laser steering parameters can be transmitted in a batch or instruction file that is executed over a period of time by the steerable laser assembly 120.

Steerable laser assembly 120 can comprise one or more laser generators 420, a laser positioner 430, and one or more detectors 440. The one or more laser generators 420 can be laser diodes (to produce one or more laser beams (e.g. beam 435) at one or more locations in the FOV determined by the laser positioner 430. Laser positioner 430 functions to steer one or more laser beams (e.g. beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam in an output direction within the FOV. For example, an electronically steerable laser assembly can have a solid state laser position comprising a plurality of optical splitters (e.g. Y-branches, directional couplers, or multimode interference couplers) to split an incoming laser beam into multiple portions. The portions of the incoming laser beam can then be transmitted to a plurality of delay line where each portion is delayed by a selectable amount (e.g. delaying a portion by a fraction of a wavelength). Alternatively the delay lines can provide wavelength tuning (e.g. selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 and one or more laser generators 420 can be combined onto a chip-scale optical scanning system such as DARPA's Short-range Wide-field-of-view extremely agile electronically steered Photonic Emitter (SWEEPER).

Detector 440 can contain light sensors 450 (e.g. photo-diodes, avalanche photodiodes, PIN diodes or charge coupled devices CCDs), signal amplifiers (e.g. operational amplifiers or transconductance amplifiers), a time of flight calculator circuit 455 and an intensity calculator 460. Detector 440 can comprise one or more photodiodes, avalanche photodiode arrays, charge coupled device (CCD) arrays, single photon avalanche detectors (SPADs), streak cameras, amplifiers and lenses to focus and detect reflected laser light from laser beam 440. The construction of the steerable laser assembly 120 can co-locate detector 440 and laser positioner 430 such that detector 440 is pointed in the direction of the outgoing laser beam and can focus the detector on a narrow part of the FOV where the reflected light is anticipated to come from.

The steerable laser assembly 120 of laser range finder 405 can generate a pulsed or continuous laser beam 435. Steerable laser assembly 120 can receive one or more laser reflections 445 corresponding to laser beam 440. Laser range finder 405 can contain a light sensor 450 to detect reflected light from the laser pulses or continuous laser beam.

Steerable laser assembly 120 can contain a time of flight calculator 455 to calculate the time of flight associated with a laser pulse striking an object and returning. The time of flight calculator 455 can also function to compare the phase angle of the reflected wave with the phase of the outgoing laser beam and thereby estimate the time-of-flight. Time of flight calculator can also contain an analog-to-digital converter to convert an analog signal resulting from reflected photons and convert it to a digital signal. Laser range finder 405 can contain an intensity calculator 460 to calculate the intensity of reflected light. Time of flight calculator can also contain an analog-to-digital converter to convert an analog signal resulting from reflected photons and convert it to a digital signal.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g. a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g. in the same enclosure), thereby enabling processing of the sensor data (e.g. reflection ranges) without the need to transmit the reflection data over a wired or wireless link. FIG. 4A is an example of an embedded processing architecture where the latency associated with a long distance communication link (e.g. Ethernet) is avoided when transmitting range data to the sensor data processor.

Figure 4B:
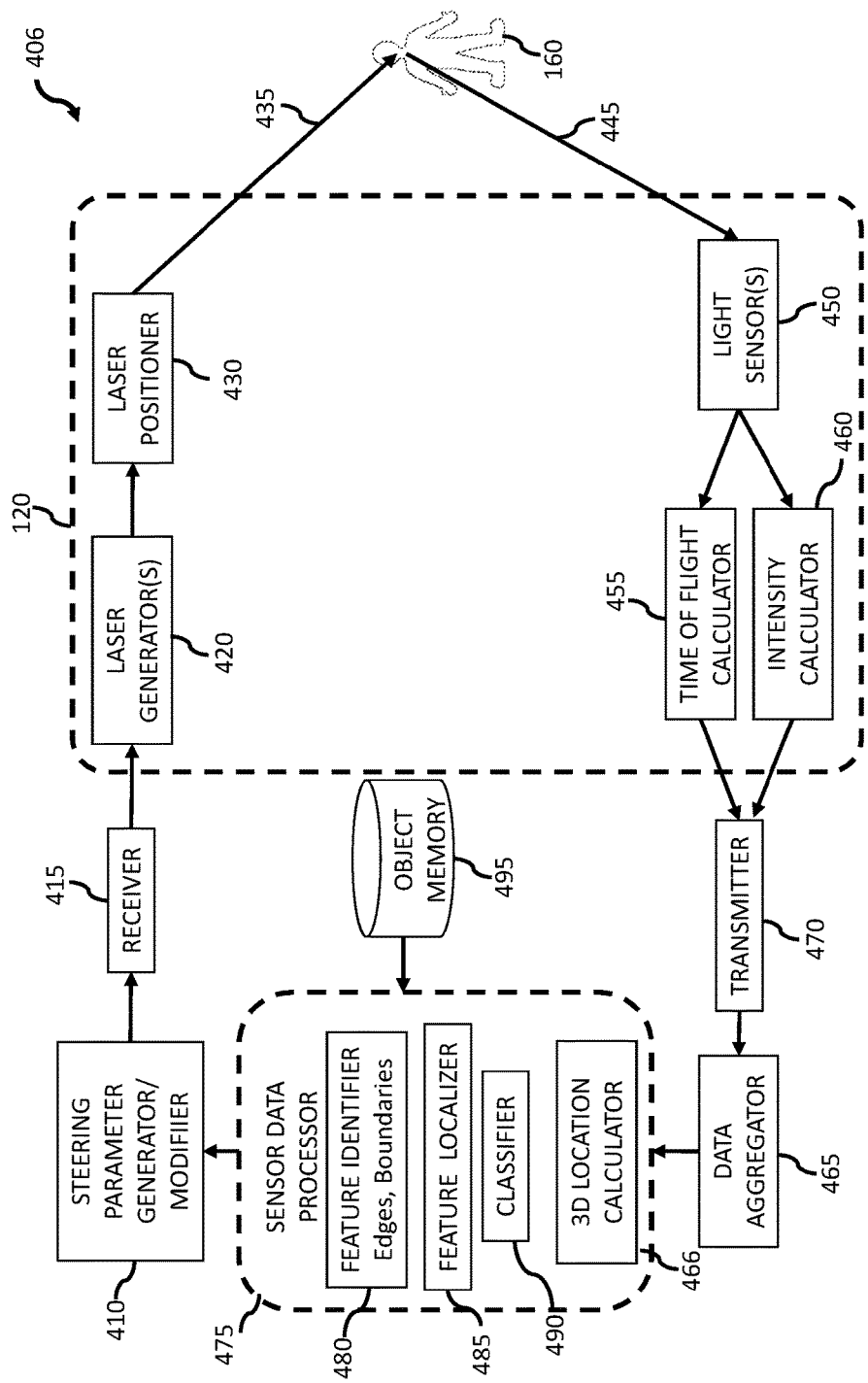

FIG. 4B illustrates several components of a dynamically steered laser range finder system 406 in accordance with an embodiment of this disclosure. In this embodiment the data processing and laser steering parameter generation components are remotely located from the steerable laser assembly 120. Laser range finder 406 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

FIG. 5A illustrates several components of a laser range finder 510 according to several embodiment of the present disclosure. Laser range finder 510 can contain a processing subassembly 520, a steerable laser assembly subassembly 120 and a communication link 530 for linking the processing and steerable laser assemblies. Processing subassembly 520 can include one or more processors (e.g. sensor data processor 475 in FIGS. 4A and 4B) one or more transceivers (e.g. a transceiver including receiver 415 and transmitter 470) such as an Ethernet, RS485, fiber optic, Wi-Fi, Bluetooth, CANBUS or USB transceiver. Processing subassembly 520 can also include a computer-readable storage medium (e.g. flash memory or a hard disk drive) operable to store instructions for performing a method to detect and utilize a remote mirror (e.g. a roadside mirror). Steerable laser assembly 120 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly laser positioner 430 can function to receive instructions (e.g. laser steering parameters) and thereby delay portions of a laser beam (i.e. create a phase difference between copies of the laser beam) and then combine the portions of the laser beam to form an output beam positioned in a direction in the FOV. A mechanical laser positioner 430 can be a mirror and mirror positioning components operable to receive input signals (e.g. PWM input to a steeper motor) based on laser steering parameters and thereby steer the mirror to position a laser in a direction in the FOV. Steerable laser subassembly 120 can also include a detector 440 comprising components such as light sensor(s) 450, time of flight calculator 455 and light intensity calculator 460 and 3D location. Steerable laser subassembly 120 can include one or more transceivers (e.g. receivers 415 and transmitters 470) such as Ethernet, RS485, fiber optic, Wi-Fi, Bluetooth, CANBUS, or USB transceivers. Communication link 530 can be a wired link (e.g. an Ethernet, USB or fiber optic cable) or a wireless link (e.g. a pair of Bluetooth transceivers). Communication link 530 can transfer laser steering parameters or equivalent instructions from the processing subassembly 520 to the steerable laser assembly 120. Communication link 530 can transfer ranging data from the steerable laser assembly to the processing subassembly 520.

When operable linked to steerable laser assembly 120 the processing subassembly 520 can perform one or more embodiments of the method to find, utilize and correct for a remote mirror in the FOV of laser range finder 510.

FIG. 5B illustrates exemplary laser steering parameters according to aspects of the technology. Laser steering parameters can be instructions operable to steer a laser beam with a steerable laser assembly in a FOV or steer a controllable magnifier. For example, in an electronically scanned laser range finder (e.g. model S3 from Quanergy Inc. of Sunnyvale, Calif.) a set of laser steering parameters can define aspects of the output laser beam such as the direction, pulse duration, intensity and spot size. Laser steering parameters can function to instruct the laser generator 420 to define aspects such as laser spot size, intensity and pulse duration. Laser steering parameters can instruct laser positioner 430 how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters similar to the parts of an stereolithography (.STL) file. STL files are commonly used as instruction sets to position extruder heads and cutting heads in 3D printers, cutting tools and laser stereolithography. A set of laser steering parameters 501 can include a start location 502 indicating where one or more other laser steering parameters should be applied. Start location 502 can be a point in a Cartesian coordinate system with an associated unit of measure (e.g. 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV. A laser steering parameter can be a region width 504 or a region height 506. The width and height of can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed 514, laser pulse size 516 or number of laser pulses 518.

A laser steering parameter can be one or more region boundaries 508 defining the bounds of a region. A laser steering parameter can be one or more laser pulse locations 511. Pulse locations 511 can provide instructions to a steerable laser to move to corresponding positions in the FOV and generate on or more laser pulses. In some embodiments the laser can be generating a laser beam while being steered from one location to another and can dwell for some time at the laser pulse locations. In other embodiments the steerable laser can use these points 511 to generate discrete pulses the defined locations. In such embodiments the laser beam can be generated at discrete pulse locations and can dwell at the pulse location for some time.

A laser steering parameter can be one or more path waypoints 512, which define points in a FOV where a steerable laser can traverse or points at which the steerable laser can implement direction changes. FIG. 5C illustrates two exemplary paths 540 and 550 that can be defined by path waypoints (e.g. waypoints 512) and can be used to instruct LIDAR 110. It would be obvious to a person of skill in the art that several laser steering parameters can produce equivalent or nearly equivalent regions of non-uniform pulse density. For example, selecting various combination of laser steering parameters such as combinations of paths 540 and 550 to produce similar regions of increased or non-uniform laser pulse density.

Figure 6A:
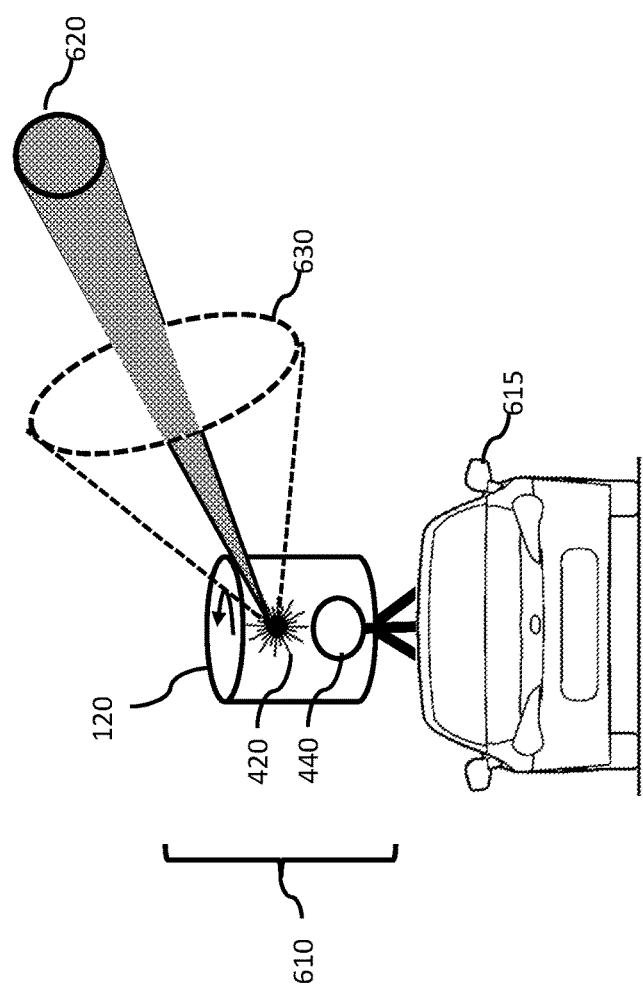
FIGS. 6A, 6B and 6C illustrate exemplary laser range finders according to embodiments of the present disclosure.

FIG. 6A illustrates a vehicle 615 with a laser range finder 610 operable to generate a plurality of laser pulses with variable intensity into the vicinity of the vehicle 615. In the embodiment of FIG. 6A laser range finder 610 can comprise a steerable laser assembly 120 operable to rotate and distribute laser pulses in the surrounding environment. In one aspect, a laser generator 420 in steerable laser assembly 120 can receive instructions to generate laser pulses of various intensities as the steerable laser assembly rotates. Laser generator 420 and a laser positioner (e.g. 430 in FIG. 4A) can act in combination to generate a high-intensity zone 620 comprising a set of laser pulses each with an intensity above a threshold intensity. The high-intensity zone can be a discrete zone (e.g. cone shaped) of the vicinity of the laser range finder 610 through which high-intensity laser pulses travel. In one aspect, laser range finder 610 can generate a second set of guard laser pulses that occupy a guard zone 630 around the high-intensity zone 620. For example, high-intensity laser pulses can have an initial intensity above an eye-safe intensity at the aperture of laser range finder 610 (e.g. an exit window of the laser range finder). The second set of guard laser pulses can each have an initial intensity below the eye-safe intensity. Reflections from objects in the guard zone and corresponding object distances can function to discontinue the emission of high-intensity laser pulses in the high-intensity zone or cause range finder 610 to emit lower intensity laser pulses in the high-intensity zone.

Figure 6B:
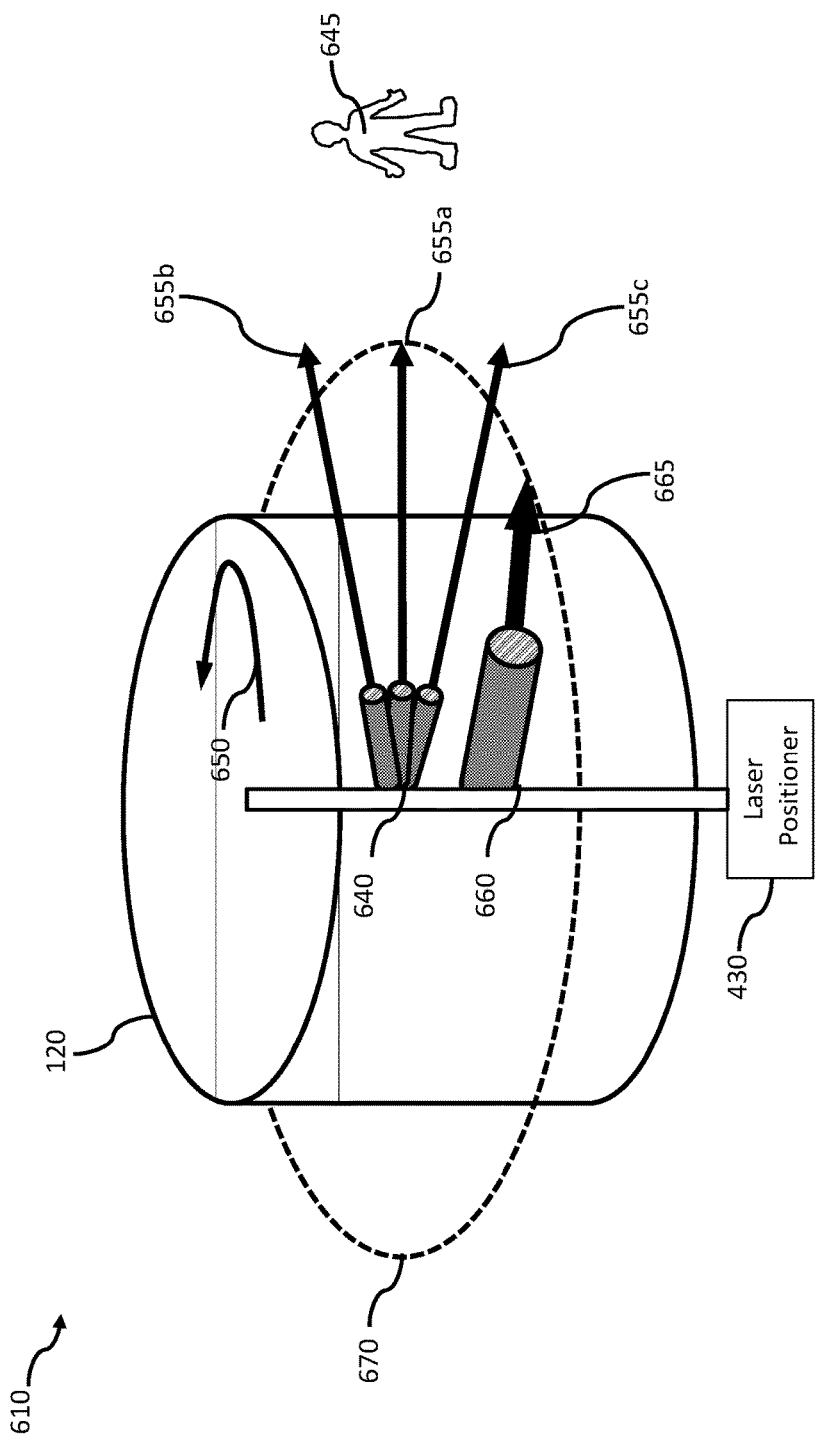

FIG. 6B illustrates laser range finder 610 operable to generate the high-intensity zone 620 and guard zone 630 of FIG. 6A. Laser range finder 610 can comprise a laser positioner (e.g. an induction motor) to rotate or otherwise position one or more guard laser generators 640. In the embodiment of FIG. 6B laser positioner 430 can rotate steerable laser assembly 120 counter-clockwise in direction 650. Guard laser generators 640 are positioned to generate guard laser pulses (e.g. 655a, 655b and 655c) that precede the path of high-intensity laser generator 660 operable to generate high-intensity laser pulses (e.g. laser pulse 665). Reflections from guard laser pulses (e.g. 655a-c) can function to detect person 645 before high-intensity laser pulses are launched in the direction of person 645. For example, laser positioner 430 can rotate steerable laser assembly 120 at 10 Hz and high-intensity laser generator 660 can be positioned 90 degrees (e.g. one quarter rotation) behind the guard laser generators 640. In this example, guard laser pulses are generated 25 milliseconds before high-intensity laser pulses are launched in the equivalent direction. Detection of person 645 in the path of the high-intensity beam can be used to determine the intensity of laser pulses from laser generator 660. For example, laser generator 660 can be instructed to discontinue generator or to decrease the intensity of laser pulses to coincide with the direction of person 645. Laser generator 660 can generate high-intensity laser pulses in some or all of azimuthal plane 670. Some of the guard pulses can be on the same azimuthal plane as high-intensity pulses (e.g. guard pulse 655a with the same elevation angle as high-intensity laser pulses 665), while other guard laser pulses can have higher or lower elevation angles (e.g. laser pulses 655b and 655c), thereby providing early indication of objects that could stray into the path of high-intensity laser pulses (e.g. 665) by moving up or down in elevation to enter the azimuthal plane of high intensity laser pulses.

Figure 6C:
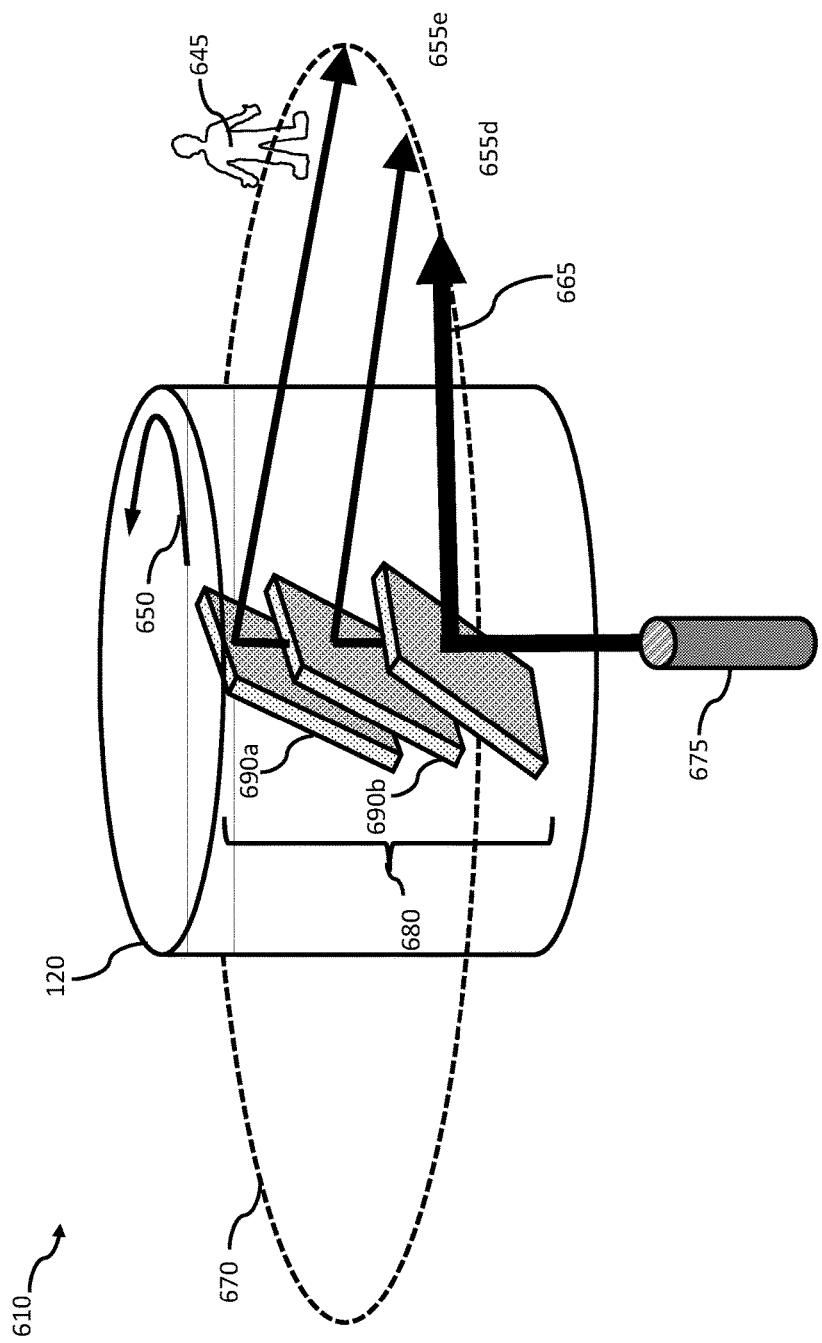

FIG. 6C illustrates another embodiment of a mechanically steered laser range finder 610 operable to generate a set of guard laser pulses that precede and form a basis for modulating the intensity of high-intensity laser pulses or variable intensity laser pulses. In FIG. 6C a mirror assembly 680 comprising one or more mirrors (690a and 690b) works in combination with a variable intensity laser generator 675. Laser generator 675 can generate a first set of guard laser pulses (655d and 655e) that are deflected by the mirror assembly 680 to perform laser ranging ahead of a set high-intensity laser pulses (e.g. 665). For example, mirror assembly 680 can comprise a plurality of electrically switchable mirrors (e.g. switchable mirrors from the e-Transflector™ product line available from Kent Optronics of Hopewell Junction N.Y.) Alternatively, a mirror in mirror assembly 680 can be an imperfect mirror and deflect a high-intensity laser pulse 665 while transmitting some of the laser light or laser pulses to mirrors 690a and 690b positioned to generate guard laser pulses 655d and 655e that spatially precede the high-intensity laser pulse 665. Upon detection of an object (e.g. person 645) by guard laser pulses, subsequent high-intensity laser pulses can be attenuated or discontinued. Mirrors 690a and 690b or reflectors that generate guard laser pulses can be repositionable to cause guard laser pulses to precede adaptive-intensity laser pulses (e.g. pulses 665) by a variable amount (e.g. guard laser pulses leading high intensity laser pulses by 30-60 degrees in the azimuthal plane 670).

Figure 7A:
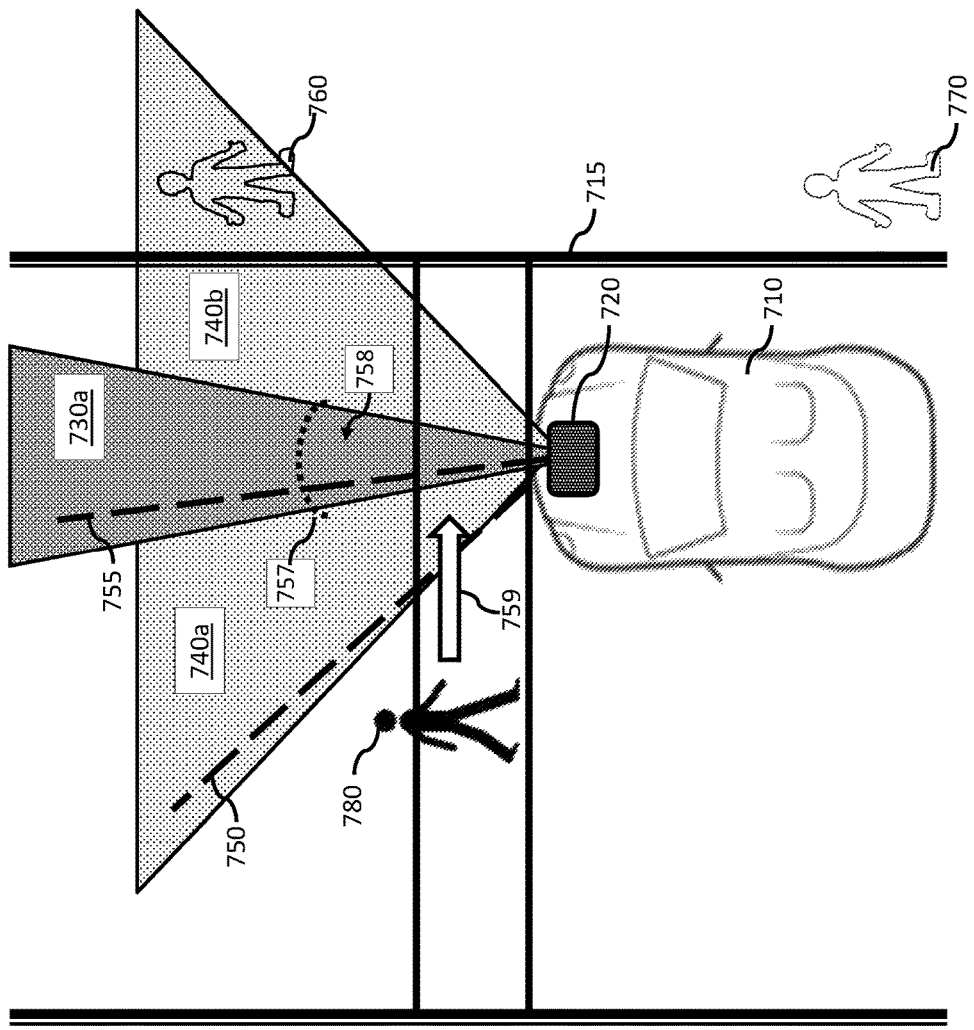
FIG. 7A is an exemplary conceptual illustration of a system for generating high-intensity laser pulses surrounded and controlled by aspects of guarding laser pulses according to an embodiment of the present disclosure.

FIG. 7A illustrates a vehicle mounted laser range finder 720 that uses data from laser pulses in two guard zones to protect objects and people from high-intensity laser pulses in a high-intensity zone. An objective of laser range finder 720 can be to generate high-intensity laser pulses in a high-intensity zone (e.g. the volume of the vicinity in which laser pulses from a high-intensity region of the FOV travel) contingent on data indicating that a portion of the high-intensity zone (e.g. a keepout zone) is free from objects or imminent ingress by objects. For the purpose of this disclosure a keepout zone can be considered a region of space in the vicinity of a laser range finder in which the intensity of laser pulses is above a corresponding threshold intensity.

Laser range finder 720 is designed to address several challenges associated with safely generating a set of high-intensity laser pulses. One challenge is to diminish laser intensity and thereby eliminate the keepout zone 758 before a person 780 reaches the keepout zone. A related challenge is to increase the accuracy of indications of future ingress into a keepout zone, thereby decreasing the number of false positive ingress indications. For example, the challenge of false positive ingress indications can be to differentiate person 780 on a trajectory that intersects the keepout zone from person 770 who is in the vicinity of the vehicle 710 but not in imminent danger of entering the keepout zone. Similarly person 760 who is adjacent to the keepout zone (or perhaps at a distance beyond the keepout zone) but has a trajectory that will pass to one side of the keepout zone as vehicle 710 moves down street 715.

Previous solutions were to monitor for objects in the keepout-zone and discontinue laser pulses upon detection of a person. A disadvantage of this approach is that person 780 is irradiated with high-intensity laser pulses for as long as it takes laser range finder 720 to discover the presence of person 780.

Turning in detail to the embodiment of FIG. 7A laser range finder 720 is mounted to the front of vehicle 710 and can be a solid state electronically steered LIDAR (e.g. the model S3 available for Quanergy Inc. or Sunnyvale Calif.). Laser range finder 720 generates a set of high-intensity laser pulses 755 in a high-intensity zone 730a, each with an initial intensity above a threshold intensity. Laser pulses 755 have a corresponding beam divergence and therefore the intensity diminishes as they travel from the laser range finder. The intensity of laser pulses 755 can remain above an eye-safe intensity threshold out to a threshold distance 757. The range of directions comprising the high-intensity zone 730a combined with the threshold distance can define a keep-out zone 758.

Laser range finder 720 further generates a guard set of laser pulses (e.g. pulses 750), each with an intensity below the threshold intensity in two guard zones 740a and 740b. The guard zones 740a and 740b are positioned on either side of the high-intensity zone, thereby providing that a large number of potential ingress trajectories (e.g. trajectory 759) into the keep-out zone require an object to first travel through a guard zone. Laser range finder 720 can contain a detector and a processing subassembly (e.g. processing subassembly 520 and detector 440 in FIG. 5A). The detector can detect a set of laser reflections from the guard set of laser pulses in the guard zones (e.g. pulses 750) and thereby generate reflection data indicative of the range to objects in the guard zones. Processing subassembly can process the reflection data, and can instruct a laser generator (e.g. 420 in FIG. 5A) to continue or discontinue high-intensity laser pulses or attenuate laser pulses based on identifying aspects of objects in the guard regions. Exemplary aspects can be presence of an object, trajectory of an object or range to an object, such as placement of an object within a threshold distance.

In several aspects the guard laser pulses and guard zones can provide sufficient time to analyze objects for potential future ingress into a high-intensity zone. This is useful because many objects can naturally move in a trajectory away from the high-intensity regions during monitoring the in guard zone. The guard zones can be sized to provide sufficient reaction time to determine aspects (e.g. trajectory) of objects. In one aspect, as vehicle 710 drives down street 715 person 760 may appear in guard region. Person 760 can be standing on a footpath beside street 715. The guard region and associated reflection data can provide basis to determine the person 760 is proceeding towards the right side of guard region 740b, and hence is not on a collision course with keep-out zone 758. In another aspect, a processing subassembly in laser range finder 720 can process reflection data from the guard regions and identify that person 780 is on a collision course with the keepout region. In one aspect a guard zone can be a region of space, adjoining a high-intensity zone, through which guard laser pulses travel, such that reflections from the guard laser pulses are operable to control the intensity of laser pulses in the adjoining high-intensity zone. Guard zones can be defined as the volume of space in which guard laser pulses are operable to provide reflections that can control at least in part the intensity of subsequent laser pulses in a high-intensity zone. In the embodiment of FIG. 7A the guard zones have a range of azimuthal angles that extend beyond the range of azimuthal angles of the high-intensity zone, thereby providing that a person 780 on a trajectory 759 must enter a guard zone before entering the high-intensity zone.

FIG. 7B illustrates a vehicle mounted bistatic laser range finder operating according to an embodiment of the present technology. In a bistatic laser range finder the detector 440 is located some distance from the laser generators. An objective of the bistatic laser range finder 720 can be to generate high-intensity laser pulses in a high-intensity zone (e.g. comprising a well-defined set of directions) contingent on data indicating that a portion of the high-intensity zone (e.g. a keepout zone) is free from objects or imminent ingress by objects using lower-intensity laser pulses in the high-intensity zone. In the embodiment of FIG. 7B a main laser generator 420 is mounted on vehicle 710 separate from detector 440. For example, main laser generator 420 can be located behind the front grille of vehicle 710 and detector 440 can be located on the roof or behind the windshield. Main laser generator 420 can initially generate high-intensity laser pulses 755 in region 730a of the vicinity of vehicle 710. The bistatic laser range finder also comprises two dedicated guard laser generators 785a and 785b laser generators separate from the main laser generator. Guard laser generators 785a and 785b can be dedicated to generating guard laser pulses below a threshold intensity in regions 740a and 740b. Reflections from guard laser pulses (e.g. reflection 793) can occupy guard regions 796a and 796b of the detector FOV 790. The detector 440 can detect a set of reflections (e.g. reflection 793) corresponding to laser pulses in the guard zones of the vicinity. For example, the detector can be configured to generate reflection data from reflections corresponding to the guard laser pulses. Reflections from guard laser pulses can be recognized based on aspects of the laser light, time correlation with transmitted guard laser pulses or association with regions 796a and 796b of the detector FOV. Detector 440 can be operable coupled to a processing subassembly 520 and can transmit reflection data from reflections corresponding to the set of guard pulses to the processing subassembly. In various embodiments the processing subassembly can instruct the main laser generator to discontinue or reduce the intensity of laser pulses in the adaptive-intensity region 798 of detector FOV 790 (e.g. corresponding to high-intensity zone 730a) based on sensing an object in a guard region (e.g. 796a) of the FOV, or based on the result of a safety test performed on the reflection data. Guard laser generators 785a and 785b can be laser diodes that progressively scan in zones 740a and 740b or flash laser diodes that illuminate all of the guard zones at once. For example, detector 440 can be an array of charge coupled devices or avalanche photo diodes operable to gather data from the entire guard region 796a and 796b simultaneously in response to guard laser diodes emitting a laser flash in the guard zones 740a and 740b. The shape of the guard zones can be defined in part by a mask placed in front of the guard laser generators. The guard laser generators can be incorporated into a headlight assembly, behind a vehicle grille or behind a windshield.

Figure 8A:
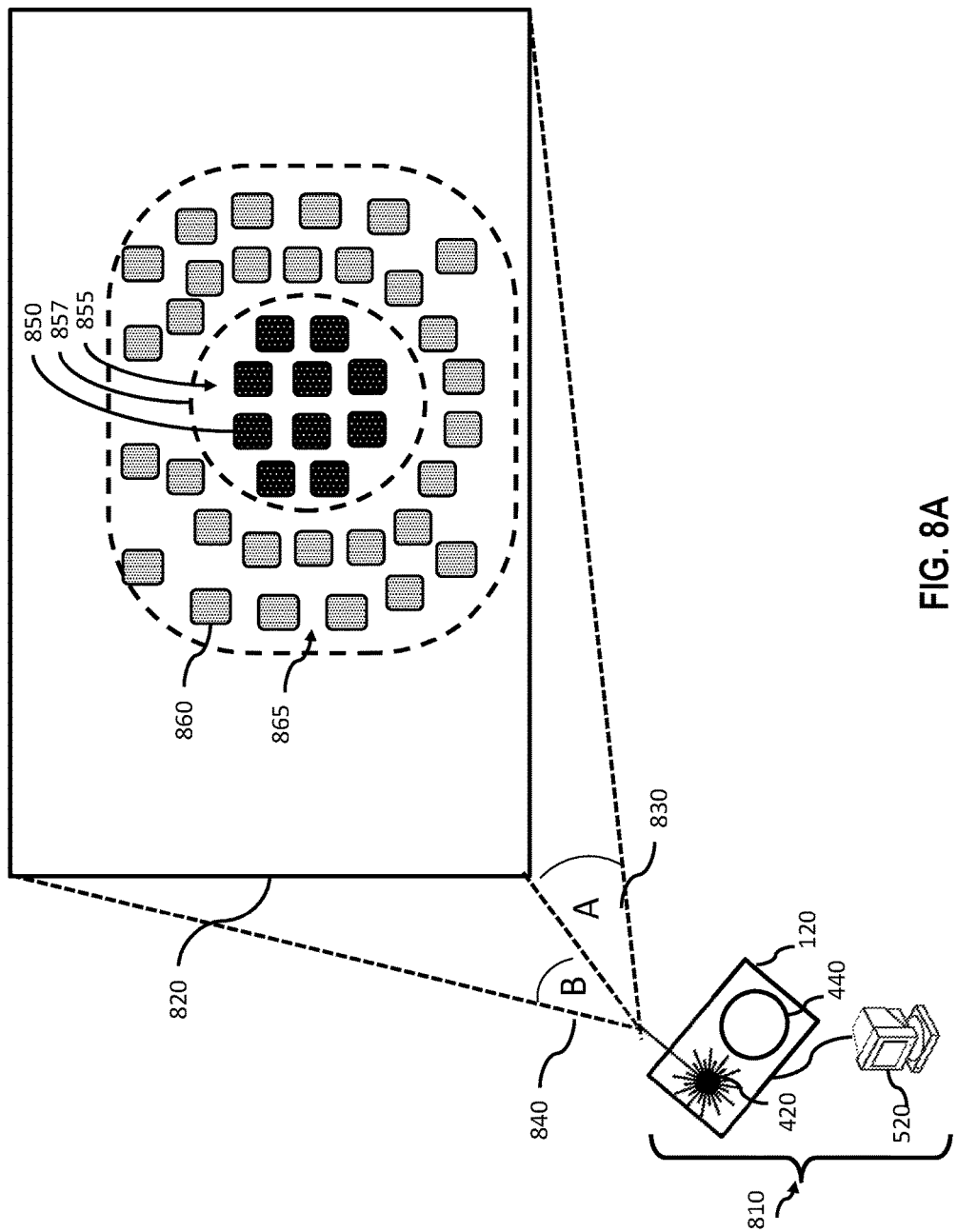
FIGS. 8A, 8B and 8C illustrate exemplary fields of view for a laser range finder including an adaptive-intensity region and guard regions of the fields of view, according to several embodiments of the present disclosure.

FIG. 8A illustrates a laser range finder 810 according to an embodiment of the present disclosure having a FOV 820 comprising a range of azimuthal angles 830 and a range of elevation angles 840. Laser range finder 810 generates a set of high-intensity laser pulses (e.g. pulse 850) in a adaptive-intensity region 855 of the FOV. Adaptive-intensity region 855 can comprise a perimeter 857 encompassing the set of high-intensity laser pulses. In one embodiment the perimeter can be a minimum perimeter defined as the smallest possible enclosed shape in the FOV that fully encloses the set of high-intensity laser pulses. Each of the set of high-intensity laser pulses can have an initial laser intensity at the aperture (e.g. exit) of the laser range finder 810 that is above a threshold value (e.g. a threshold intensity of 1 W/cm$^2$). Laser range finder 810 generates a set of guard laser pulses (e.g. laser pulse 860) with directions encompassed by a guard region 865 in the FOV. In the embodiment of FIG. 8A guard region 865 surrounds the entire exterior perimeter 857 of the adaptive-intensity region 855. Each laser pulse in the set of high-intensity laser pulses can have an initial laser intensity at the aperture (e.g. exit) of the laser range finder 810 that is below the threshold value. In the embodiment of FIG. 8A upon generation of the set of high-intensity laser pulses in the adaptive-intensity region and the surrounding guard set laser pulses, subsequent laser pulses in the adaptive-intensity region can have intensity dependent aspects of reflections form the guard region of the FOV. In one embodiment guard region 865 can be mutually exclusive from adaptive-intensity region 855 such that the two regions occupy non-overlapping sets of directions in the FOV 820.

Figure 8C:
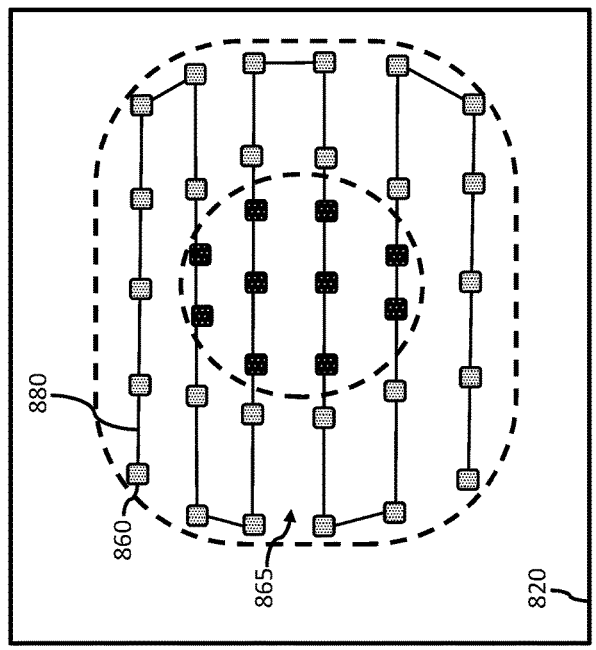
Figure 8B:
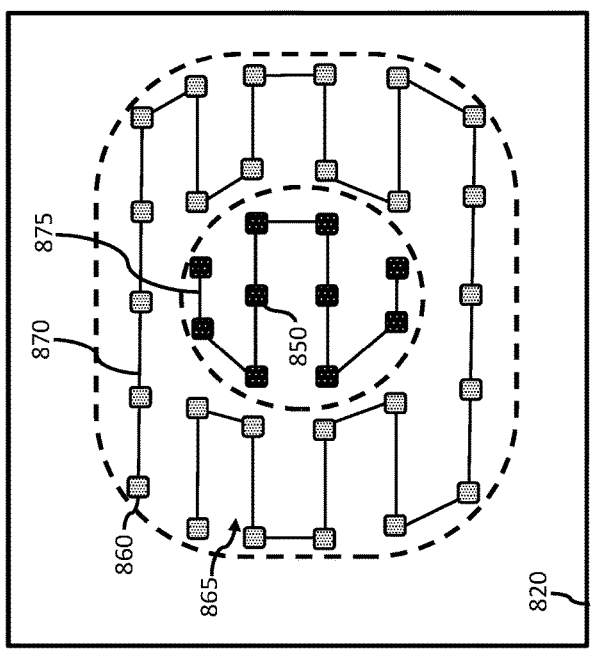
Figure 8B:
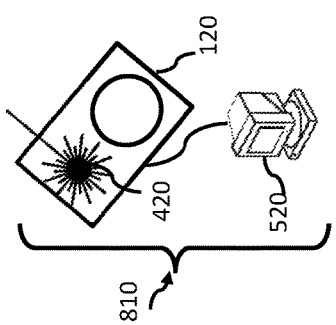

FIG. 8B and FIG. 8C illustrate two method to generate the high-intensity and guard laser pulses with appropriate placement to ensure safe operation in accordance with embodiments of the present disclosure. In FIG. 8B a steerable laser assembly in laser range finder 810 dynamically steers at least one laser beam in a complex pattern along path 870 in FOV 820 to generate the guard set of laser pulses (e.g. laser pulse 860). Simultaneously, or subsequently the steerable laser assembly can steer a laser beam along path 875 to generate high-intensity laser pulses (e.g. laser pulse 850). In this way steerable laser assembly 120 can generate a pattern of laser pulses in FOV 820 with a bimodal distribution of laser pulse intensities forming an adaptive-intensity region and a protective guard region.

In FIG. 8C steerable laser assembly 120 can dynamically steer a laser beam along a single path 880 with dynamically varying laser intensity and thereby generate the high-intensity pulses and the guard pulse in the course of a single scan.

Figure 9B:
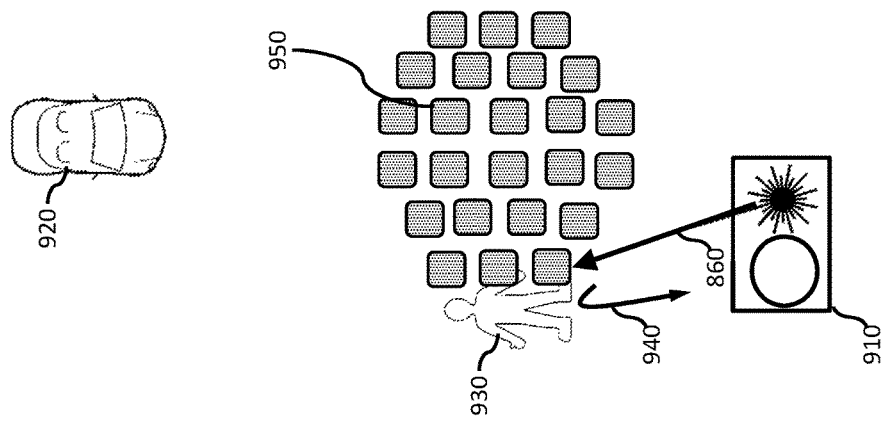
FIGS. 9A and 9B are exemplary conceptual illustrations of controlling the operation of a laser device according to an embodiment of the present disclosure.
Figure 9A:
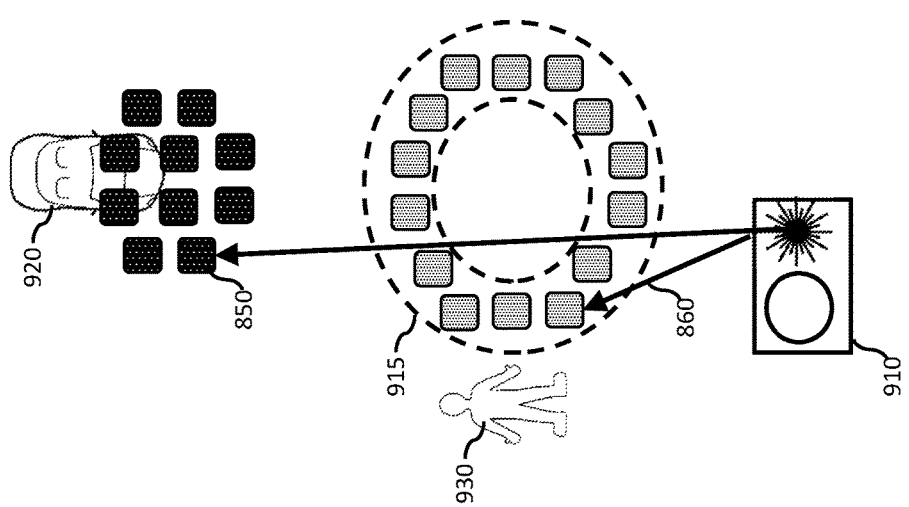

FIG. 9A illustrates an embodiment wherein a laser range finder 910 generates a set of high-intensity laser pulses (e.g. pulse 850) operable to perform ranging at a further distance than an encompassing guard set of laser pulses (e.g. laser pulse 860). For example, the high-intensity laser pulses are operable to provide detectable reflections from vehicle 920, while reflections form guard laser pulses (e.g. pulse 860) are operable to ensure that person 930 does not ingress into the path of the high-intensity laser pulses. In the embodiment of FIG. 9A the guard set laser pulses encircle the high-intensity pulses, such that an area 915 substantially perpendicular to the direction of travel of the guard laser pulses and containing the guard laser pulses also encompasses the high-intensity laser pulses. FIG. 9B illustrates the operation of laser range finder 910 according to an embodiment of the present disclosure. Following the generation of high-intensity laser pulses and guard laser pulses, reflections (e.g. 940) from one or more guard laser pulses in area 915 can indicate the presence of person 930 and laser range finder 910 can respond by discontinuing the high-intensity laser pulses and instead generate lower intensity eye-safe laser pulses (e.g. 950). Therefore laser range finder 910 can use the guard area 915 to detect person 930 without subjecting person 930 to high-intensity laser pulses. In the embodiment of FIG. 9B laser range finder 910 reduces the intensity of laser pulses in the adaptive-intensity set of directions based on the presence of person 930.

Figure 10A:
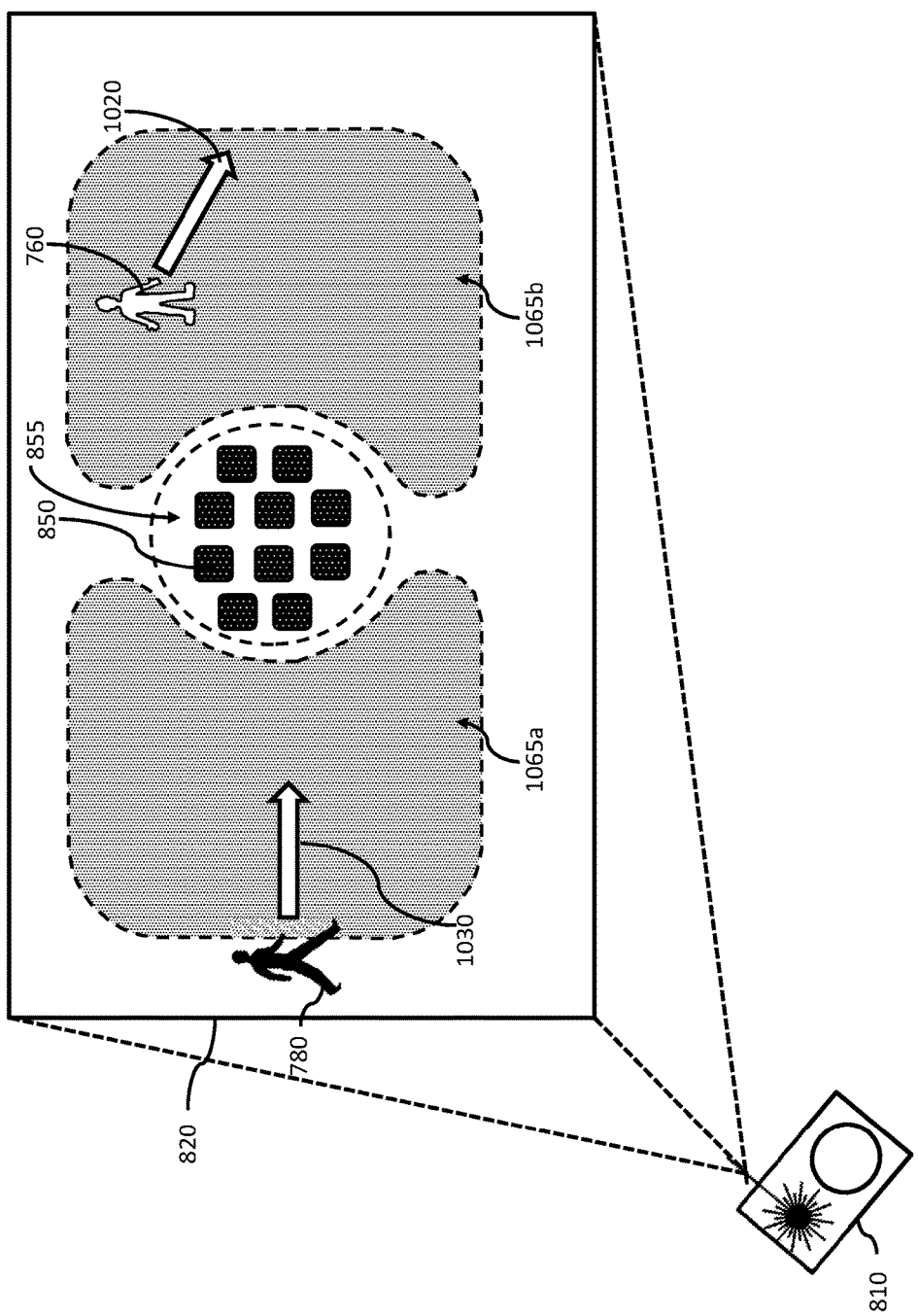
FIGS. 10A and 10B illustrate exemplary fields of view for a laser range finder and illustrate the operation of an embodiment of the present disclosure.
Figure 10B:
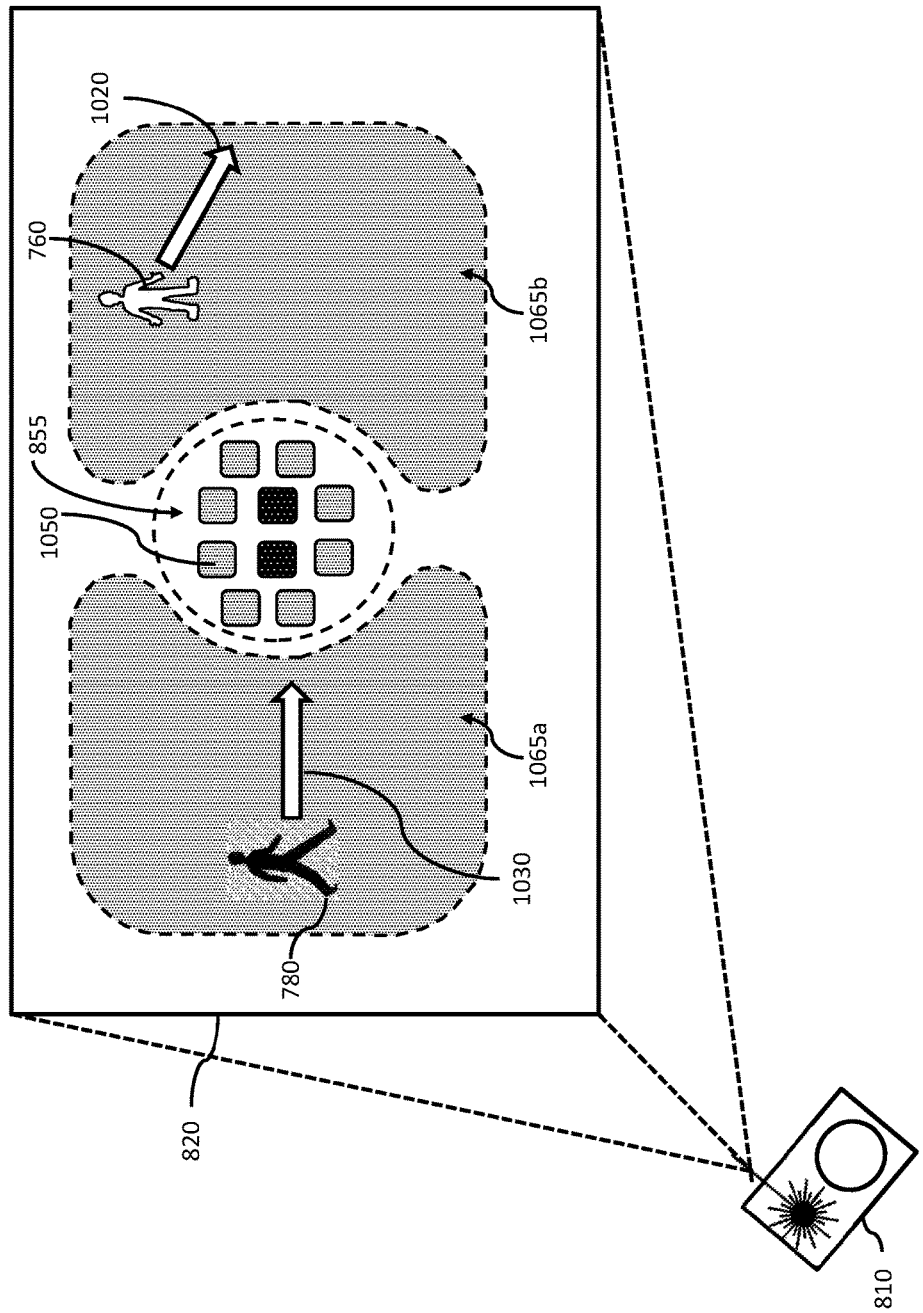

FIGS. 10A and 10B illustrate an embodiment whereby a laser range finder uses guard regions to anticipate or determine the trajectory of an object or person and thereby select the intensity of laser pulses in an adaptive-intensity region of a FOV. In one aspect, using low intensity laser pulses (e.g. eye-safe laser pulses) to encompass one or more trajectories towards an adaptive-intensity region, provides time to determine the trajectory of an object or person. This is important because often objects in guard regions may naturally have a trajectory away from the adaptive-intensity region. In this way embodiments of the present disclosure provide an eye-safe system and method to predict future ingress of object into the adaptive-intensity region while limiting false positive warnings. In this way embodiments can provide for a more complex safety test based on reflection data from a low-intensity set of guard laser pulses, instead of mere object detection.

Turning to FIG. 10A, laser range finder 810 can generate a set of high-intensity laser pulses (e.g. pulse 850) within an adaptive-intensity region of a FOV 820. Laser range finder 810 can further generate a guard set of lower intensity laser pulses in one or more guard regions 1065a and 1065b. The guard regions (e.g. 1065a and 1065b) can encompass at least some of the perimeter of the adaptive-intensity region, thereby providing that objects (e.g. person 780) on one of several trajectories (e.g. trajectory 1030) must first pass through a guard region before entering the adaptive-intensity region. In the embodiment of FIG. 10A important locations for guard regions can be on either side of adaptive-intensity region 855. Portions of the FOV directly above or below the adaptive-intensity region may not be encompasses be a guard region, since these represent less likely path for people to travel towards the adaptive-intensity region. In the embodiment of FIG. 10A person 760 and their associated trajectory 1020 can be determined based on one or more sets of laser pulses in the guard regions 1065a and 1065b. It can be determined that person 760 with trajectory 1020 moves towards the right and thereby avoids adaptive-intensity region 855.

In FIG. 10B laser range finder 810 can determine the person 780 has a trajectory 1030 that will intersect the adaptive-intensity region. In the embodiment of FIG. 10B laser range finder 810 can react by reducing the intensity of some or all of the laser pulses subsequently generated in the adaptive-intensity region (e.g. laser pulse 1050).

FIG. 11. A-C illustrate embodiments of a laser range finder that adapts the range of angles devoted to high-intensity laser pulses and associated guard zones based in part on the speed of a vehicle. In FIG. 11A vehicle 710 is travelling at 60 MPH and contains laser range finder 720. It can be appreciated that as the vehicle 710 drives forward a common relative trajectory is to pass beside people (e.g. person 760) resulting in a brief period of time where person 760 is beside vehicle 715. Therefore high-intensity laser pulses transmitted laterally (e.g. in high-intensity zone 730b) can require protection with a wide guard zone 740c. Guard zone 740c can be sized to provide sufficient time to identify and react to person 760 or identify and react to objects in general. Laser range finder 720 can generate guard zone 740c by generating a corresponding guard set of laser pulses in a guard region of the FOV with an angular range based in part on the direction of travel of the vehicle. Guard zone 740c can be generated with a set of low-intensity laser pulses (e.g. relative to high-intensity laser pulses in zone 730b) having an angular range that is based at least in part on the vehicle speed. For example, high-intensity zone 730b can have a threshold distance of 2 meters (e.g. before the intensity drops below a threshold intensity). Based on the speed of vehicle 710 laser range finder 720 can generate a guard zone sufficient to identify objects moving towards the keepout zone corresponding to the 2 meter threshold distance within high-intensity zone 730b. For example, consider that laser range finder 720 requires 250 milliseconds to detect person 760 moving towards the high-intensity laser pulses in zone 730*b* and react to diminish the intensity of subsequent laser pulses. At 60 MPH vehicle 710 moves forward 6.7 meters in 250 milliseconds. Therefore guard zone 740*c* would need to extend at least 6.7 meters in front of the high-intensity zone 730*b* in the direction of travel at a distance of 2 meters lateral to the vehicle. This results in some angular range 1105 for guard region 740*c* in the FOV of range finder 720 (e.g. 73 degrees in the above example) that can increase with the forward speed of vehicle 710.

High-intensity zone 730*c* in front of vehicle 710 can also be protected by a guard zone 740*d* that is dependent on the speed of the vehicle. For example, consider laser range finder 720 generating high-intensity laser pulses in zone 730*c* while traveling at 60 MPH on vehicle 710. The high-intensity laser pulses can remain above a threshold intensity out to a threshold distance from range finder 720, thereby generating keepout zone 758 within the high-intensity zone 730*c*. The probability of lateral intrusion into keepout-zone 758 changes with vehicle speed. In many cases to probability of intrusion is small because vehicle 710 would likely strike objects in the keepout zone 758 at 60 MPH. Hence the angular range of forward facing guard regions can decrease as vehicle speed increases.

FIG. 11B illustrates that at reduced vehicle speed (e.g. 25 MPH) the probability of lateral intrusion into a forward facing high-intensity zone increases and the guard zones 740*e* and 740*f* can be expanded to provide increased detection time (e.g. the angular range of 740*e* in the FOV of laser range finder 720 is increased relative to 740*d*). Similarly, the angular range of high-intensity zone 730*d* can be smaller than the angular range of zone 730*c*.

FIG. 11C illustrates an embodiment where a laser range finder 720 generates a high-intensity set of laser pulses based in part on satisfying a safety test by reflection data from a plurality of laser reflections in a plurality of guard zones 740*g*, 740*h*, 740*i* and 740*j*. The high-intensity zone 730*e* contains a set of laser pulses, each with an initial intensity above a threshold intensity. The intensity of the high-intensity laser pulses can remain above an eye-safe intensity out to a threshold distance 1110. Laser range finder 720 can generate lower intensity laser pulses in guard zones 740*g* and 740*h* located beside adaptive-intensity region 730*e*, each lower intensity laser pulse having initial intensity below the threshold intensity and above a second threshold intensity. In practical implementations even the guard regions 740*g* and 740*h* can exceed an eye-safe intensity if a person (e.g. person 780) were to walk into zone 740*g* and 740*h* at close range (e.g. <1 m) to the generation source. Hence even the guard regions 740*g* and 740*h* can have a threshold distance beyond which the lower laser intensity satisfied a safety criterion (e.g. an eye-safety criterion). In the embodiment of FIG. 11C laser range finder 720 generates very-low intensity laser pulses, each with an intensity below the second threshold intensity in guard zones 740*i* and 740*j*. The operation of the embodiment of FIG. 11C can be as follows: guard zones 740*g* and 740*h* can act to prevent unannounced lateral intrusion into keepout zone 758. Upon detecting a person or object in guard zone 740*g* or 740*h*, laser range finder 720 can discontinue or decrease the intensity of laser pulses in the high-intensity zone 730*e*. In turn, guard zones 740*i* and 740*j* (e.g. resulting from laser pulses with directions in guard regions of the FOV) can protect people and objects form unannounced lateral intrusion into secondary keepout zones 1130 and 1131. In a related embodiment a laser range finder can generate laser pulses in a FOV with decreasing intensity towards the edge of the FOV, where objects are likely to enter from. In respond to detecting an object entering from an edge of the FOV the laser range finder can decrease the intensity of laser pulses in portions of the FOV thereby adapting the intensities to the objects location or trajectory. In another aspect the size and shape of guard regions in the FOV can be based on the steering angle (e.g. 20 degrees left, right or straight) of the vehicle 710. For example, when vehicle 710 steers to the right, guard zones (e.g. 740*f*) can be adapted to provide a larger range of coverage angles to the right of vehicle 710, thereby effectively scanning the future path of subsequent high intensity laser pulses as the high-intensity region pans to the right.

In the embodiments of FIG. 11A-C laser range finder 720 can scan a laser beam, using a steerable laser assembly (e.g. 120 in FIG. 5A) to generate the high-intensity zones and guard zones. In alternative embodiments laser range finder 720 can dynamically steer the steerable laser assembly using laser steering parameters (e.g. instructions to position a laser positioner and select a power level) and thereby generate complex patterns of laser pulses with varying intensity.

Figures 11D, 11E, 11F:
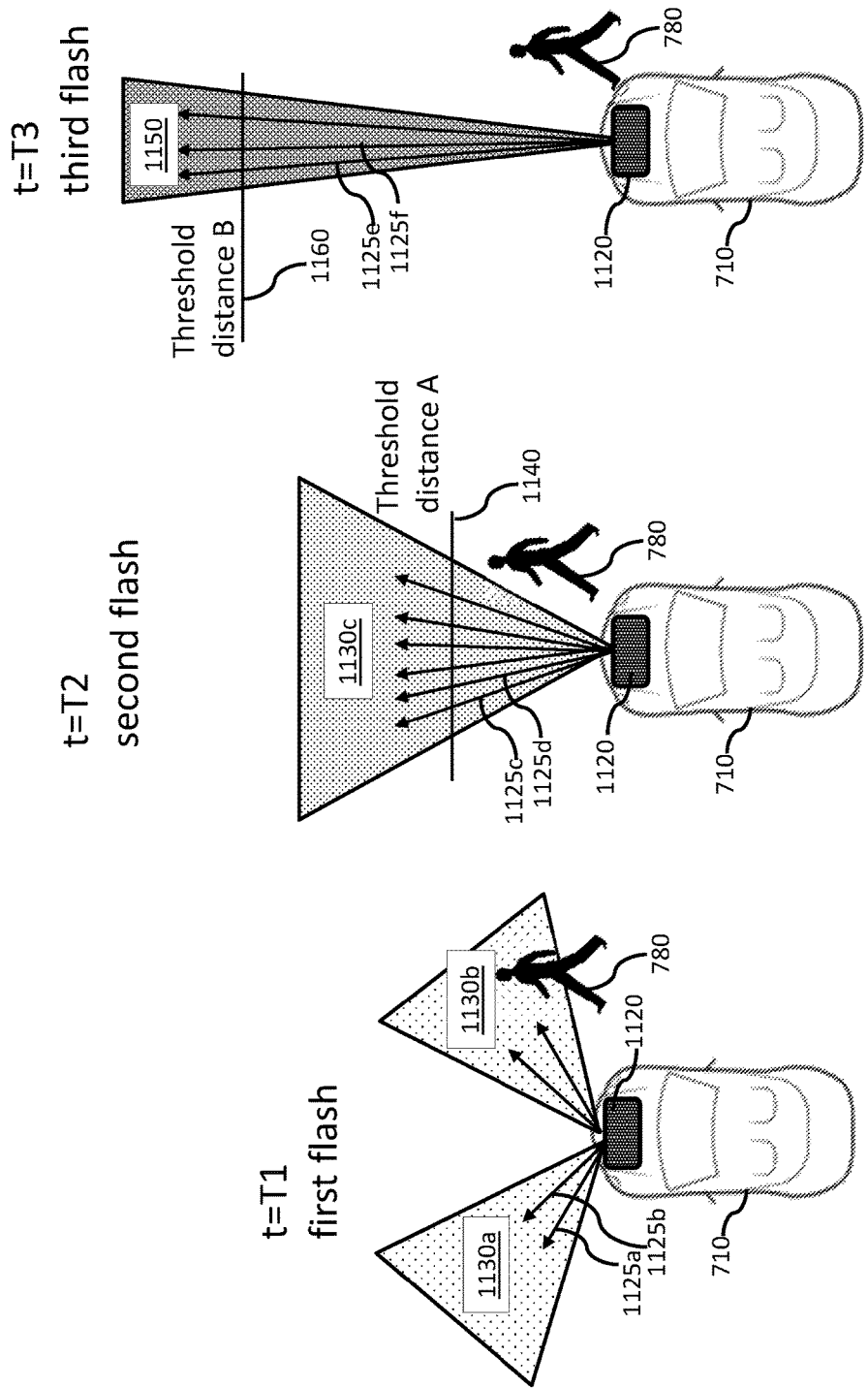

FIG. 11D-F illustrates an embodiment in which a flash LIDAR generates laser pulses in a plurality of directions at once with multidirectional laser flashes. In the embodiment of FIG. 11D-F a flash laser range finder (e.g. similar to the TigerEye Lidar available from Advanced Scientific Concepts Inc. of Santa Barbara, Calif.) can generate laser flashes in a plurality of zones and with various intensities. In FIG. 11D laser range finder 1120 can begin by generating a first laser flash in a plurality of directions (e.g. 1125*a* and 1125*b*) with an intensity at or below a first threshold, thereby forming guard zones 1130*a* and 1130*b*. The first guard zones can extend towards the edge of the FOV of laser range finder 1120, thereby operating to identify objects moving into the FOV from an edge. In FIG. 11E laser reflections from objects (e.g. person 780) can be used to determine the intensity or angular range for a second laser flash in zone 1130*c*. The second laser flash can have a higher laser intensity than the first laser flash and may have a threshold distance 1140 beyond which the laser intensity drops below a safety threshold. One advantage of this approach is that reflections from the first flash can act to guard against unannounced intrusion into the path of the second flash within the threshold distance 1140.

Laser reflections from the second flash can be used to determine the intensity or angular range for a third laser flash in zone 1150 in FIG. 11F. The third laser flash can have a higher intensity than the second laser flash and may have a threshold distance 1160 beyond which the laser intensity drops below a safety threshold. One advantage of this approach is that reflections from the second flash can act to guard against unannounced intrusion into the path of the third flash within the threshold distance 1160. FIG. 11D-F illustrate a method for generating laser flashes below a threshold intensity in order to guard against unwanted intrusion of an object into the path of a subsequent laser flash above the threshold intensity. In the case where a person or object is detected by one of the laser flashes in the guard regions the intensity of the laser flash in an adaptive-intensity region of the FOV, corresponding to high-intensity zone 1130 can be reduced to below the threshold intensity.

Figure 12:
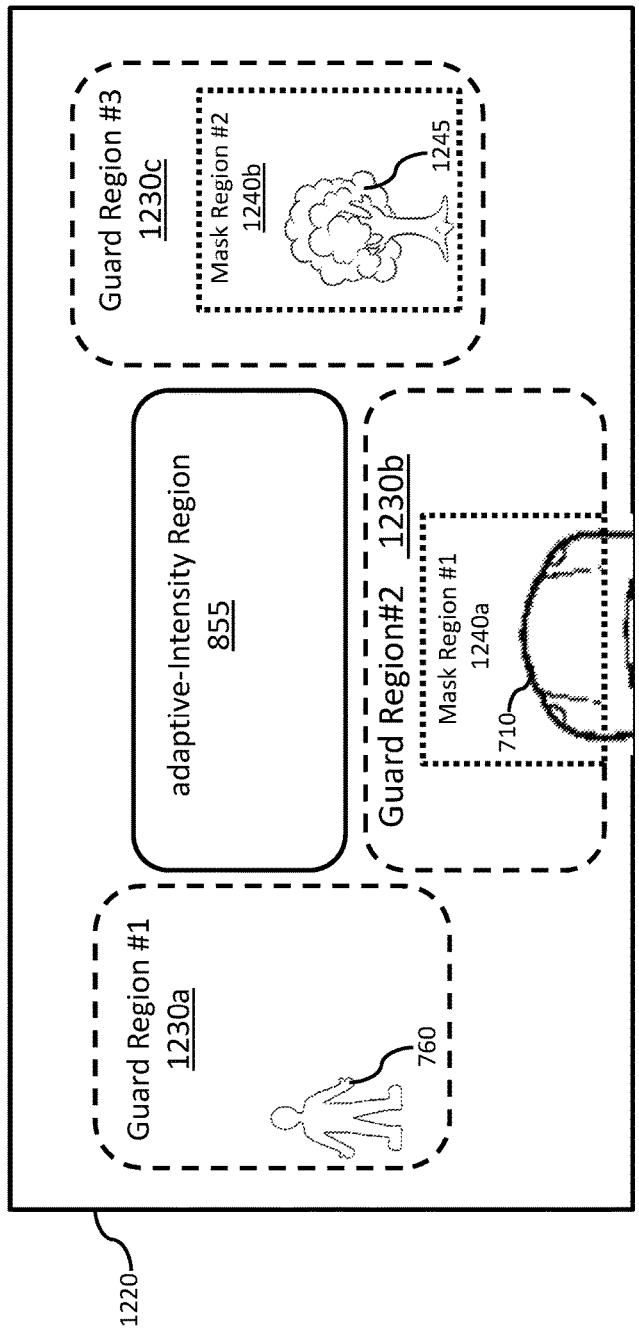
FIG. 12 illustrates a field of view of a laser range finder according to an embodiment of the present disclosure.
Figure 12:
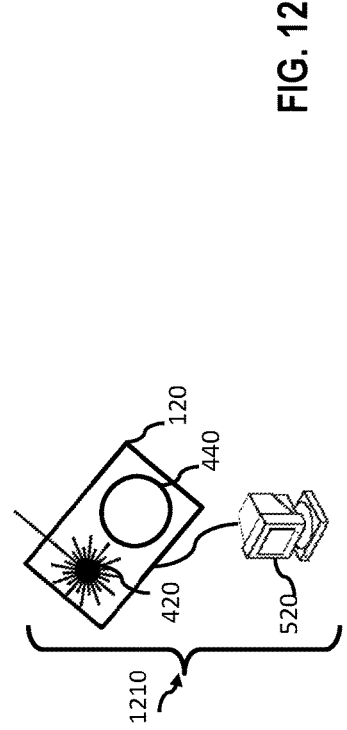

FIG. 12 illustrates an exemplary FOV for a laser range finder 1210, according to an embodiment of the present disclosure. In the embodiment of FIG. 12 laser range finder 1210 can comprise a steerable laser assembly 120 and a processing subassembly 520. Steerable laser assembly 120 can receive laser steering parameters (e.g. instructions regarding placement of laser pulses) from processing subassembly 520 and thereby generate a complex pattern of laser pulses in FOV 1220. Detector 440 in steerable laser assembly 120 can detect a set of laser reflections from FOV 1220 and processing subassembly 520 can process those laser reflections to determine the subsequent intensity of laser pulses in an adaptive-intensity region 855 of the FOV. In one aspect steerable laser assembly can generate regions in the FOV of various intensity according to the present disclosure. For example, laser range finder can generate a first set of high-intensity laser pulses in adaptive-intensity region 855. Adaptive-intensity region 855 can comprise the set of all directions in the FOV in which laser range finder 1210 can generates the first set of high-intensity laser pulse. Laser range finder 1210 can further dynamically steer laser assembly 120 to generate lower-intensity laser pulses in guard regions 1230*a*, 1230*b* and 1230*c*. In one embodiment of laser range finder 1210 the guard regions can the set of all directions for which a laser reflection from sub-threshold laser pulses (e.g. an eye-safe intensity) determine at least in part the subsequent laser intensity in the adaptive-intensity region of the FOV. Therefore in this embodiment guard regions are those parts of the FOV in which sub-threshold intensity laser pulses are operable to control the generation super-threshold laser pulses in a separate adaptive-intensity region of the FOV. Processing subassembly 520 can gather reflection data from laser pulses in the FOV and dynamically determine the size and shape of guard regions 1230*a*, 1230*b* and 1230*c*. In some situations objects detected in a guard region can have permanent placement (e.g. laser reflection indicating the hood of vehicle 710). In other situations objects in a guard region can be determined to be mundane objects such as tree 745. In one advantage the use of lower-intensity laser pulses in guard regions enables processing subassembly 520 to classify objects (e.g. as either human or inanimate) as part of a process for generating subsequent laser pulses with adaptive intensity in the adaptive-intensity region. Mask regions 1240*a* and 1240*b* serve to define sets of directions in the FOV from which laser reflections are not used (e.g. masked) in the process of determining whether to discontinue high-intensity laser pulses in the adaptive-intensity region. For example, mask region 1240*a* enables processing subassembly 520 to discount the persistent reflections form the hood of vehicle 715 in the process of adapting the intensity of laser pulses in adaptive-intensity region 855 based on a safety test performed using reflections from guard regions. In one embodiment processing subassembly can generate 520 can use historical data from laser reflections or other vehicle sensors (e.g. radar data, and camera data) to generate customized guard regions and in some cases customized adaptive-intensity regions to account for specific local environments.

For example, if two people own the same model of autonomous vehicle using embodiments of the present adaptive intensity laser range finder 1210, processing subassembly 520 can generate guard regions based on previous data (e.g. intrusion paths into high-intensity laser pulses) to best meet the goals of laser safety and ranging performance. Consider that a first driver may drive primarily in rural area with tree-lined streets and processing subassembly 520 can adapt to provide narrow guard regions or mask regions around the adaptive-intensity regions, thereby reducing false positive intensity reduction in the adaptive-intensity region caused by laser reflections form the trees. A second driver with the same model vehicle may drive primarily in urban areas where pedestrians often cross at cross-walks in front of the FOV. Processing subassembly 520 can adapt the guard regions to be wide and have a sufficiently low laser intensity (e.g. 1 mW/cm2) to remain eye-safe. In both bases the guard regions are comprises of laser pulses each with an intensity below a threshold intensity and control the intensity of laser pulses in a high-intensity portion of the FOV. In another aspect an autonomous vehicle (e.g. vehicle 710) with a laser range finder 1210 according to the present disclosure can record intrusion events into an adaptive-intensity region of the FOV (i.e. where an intrusion into an active keepout zone occurred e.g. keepout zone 758 in FIG. 7A). The use of guard regions enables valuable precursor data prior to an intrusion event to be generated using lower-intensity laser pulses. The laser range finder can adapt the shape and size of guard regions or adapt a safety test to prevent future intrusions into a keepout zone. Laser range finder 1210 can further transmit precursor data regarding ranging data prior to an intrusion event to a centralized database. Laser range finder in similar vehicles or in similar locations, can base the size and shape of guard regions in the FOV of a laser range finder at least in part on precursor data from previous intrusion events received from a centralized database. In a related aspect if several vehicle stop at a crosswalk, a first vehicle can sense a pedestrian crossing into a guard region of a first laser range finder and transmit (e.g. broadcast) a signal to other vehicle at a crosswalk indicating an object in the guard region. In this way a low-intensity set of guard laser pulses generated by a first vehicle can be used to control a high-intensity set of laser pulses generated by a neighboring vehicle.

Operation

Figure 13A:
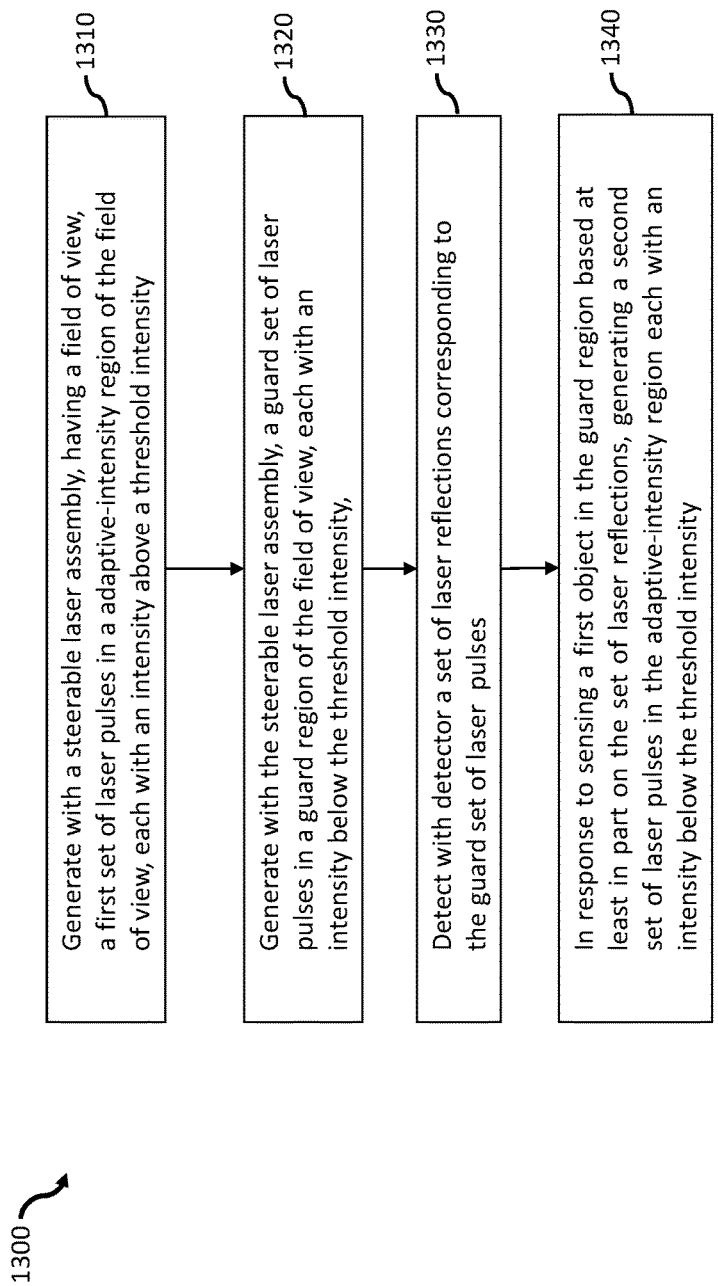
FIGS. 13A and 13B illustrate flow diagrams of methods for generating a plurality of laser pulses in an adaptive-intensity region of a field of view with intensities based at least in part on aspects of guard laser pulses from a guard region of the field of view, in accordance with an embodiment of the present disclosure.

FIG. 13A is a flow chart for a method 1300 to control the intensity of a set of laser pulses in an adaptive-intensity region of a FOV based detecting an object using laser reflections from sub-threshold laser pulses in a neighboring guard region of a FOV. At step 1310 a steerable laser assembly in a laser range finder, having a FOV generates a first set of laser pulses in an adaptive-intensity region of the FOV, each with an intensity above a threshold intensity. At step 1320 the steerable laser assembly generates, a guard set of laser pulses in a guard region of the FOV, each with an intensity below the threshold intensity. At step 1330 a detector in the steerable laser assembly detects a set of laser reflections corresponding to the guard set of laser pulses. The detector 440 can generate reflection data based on the set of laser reflections indicating the direction and range corresponding to each reflection in the set of reflections. At step 1340 in response to sensing a first object in the guard region based at least in part on the set of laser reflections, the steerable laser assembly generates a second set of laser pulses in the adaptive-intensity region each with an intensity below the threshold intensity.

Figure 13B:
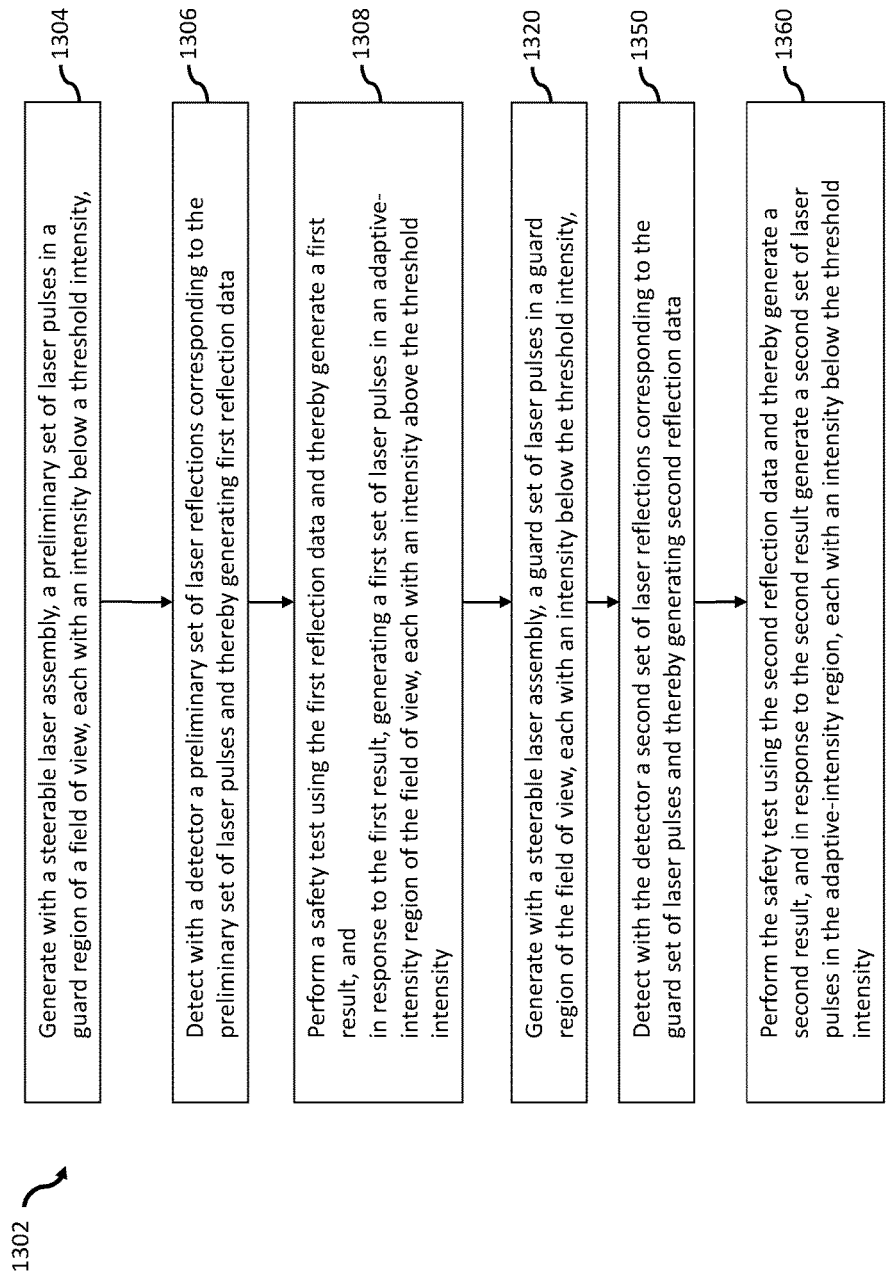

FIG. 13B is a flow chart for a related method 1302 to generate high-intensity laser pulses in a adaptive-intensity region of a FOV based on the result of safety test performed on laser reflections from a neighboring guard region. Subsequently, method 1302 generates another set of laser pulses in the guard region of the FOV, performs the safety test a second time, updates the result of the safety test, and generates a set of laser pulses with reduced intensity below a threshold intensity in the adaptive-intensity region of the FOV based at least in part on the updated result.

At step 1304 a steerable laser assembly in a laser range finder steers at least one laser beam and thereby generates, a preliminary set of laser pulses in a guard region of the field of view, each with an intensity below a threshold intensity. At step 1306 detector in the steerable laser assembly detects a preliminary set of laser reflections corresponding to the preliminary set of laser pulses and thereby generating first reflection data. The first reflection data can indicate the direction and range corresponding to laser reflections in the set of laser reflections.

At step 1308 the laser range finder performs a safety test using the first reflection data and thereby generates a first result. In response to the first result, the steerable laser range finder steers at least one laser beam and thereby generates a first set of laser pulses in an adaptive-intensity region of the field of view, each with an intensity above the threshold intensity. At step 1320 the steerable laser assembly generates, a guard set of laser pulses in a guard region of the FOV, each with an intensity below the threshold intensity. At step 1350 the detector detects a second set of laser reflections corresponding to the guard set of laser pulses and thereby generates second reflection data At step 1360 the laser range finder performs the safety test again using the second reflection data and thereby generate a second result, and in response to the second result generates a second set of laser pulses in the adaptive-intensity region, each with an intensity below the threshold intensity. The second result can indicate the intrusion of an object (e.g. a person) into the adaptive-intensity region (e.g. the path of the high-intensity laser pulses) at some time in the near future. In several embodiments of method 1302, the laser range finder discontinues generating high-intensity laser pulses and instead exclusively generates laser pulses with intensities below the threshold intensity in the adaptive region, in response to the second result.

Exemplary safety tests can be: (a) a determination of any object is detected in the guard region, (b) a determination if any object in the guard region is moving towards the adaptive-intensity region, (c) a determination if any object in the guard region will intersect with a high-energy laser pulse or ingress into the adaptive-intensity region within a threshold period of time (e.g. a person will enter the adaptive-intensity region within the next 2 seconds), (d) a determination, based on reflection data from the set of guard laser pulses that an object exists in a guard region and within a threshold distance, or (e) a determination whether reflection data indicates an object in the guard region with an angular velocity (e.g. rate of change of direction in the FOV) above some threshold. Exemplary safety test results can be (a) satisfaction of a criterion (e.g. safety test result=TRUE), (b) dissatisfaction of a safety test (e.g. safety test result=FALSE), (c) an indication of a highest or lowest value (e.g. the closest proximity of an object to the adaptive intensity zone, such as result=10 meters) or (d) a velocity or angular velocity towards a keepout-zone for one or more objects.

Figure 14A:
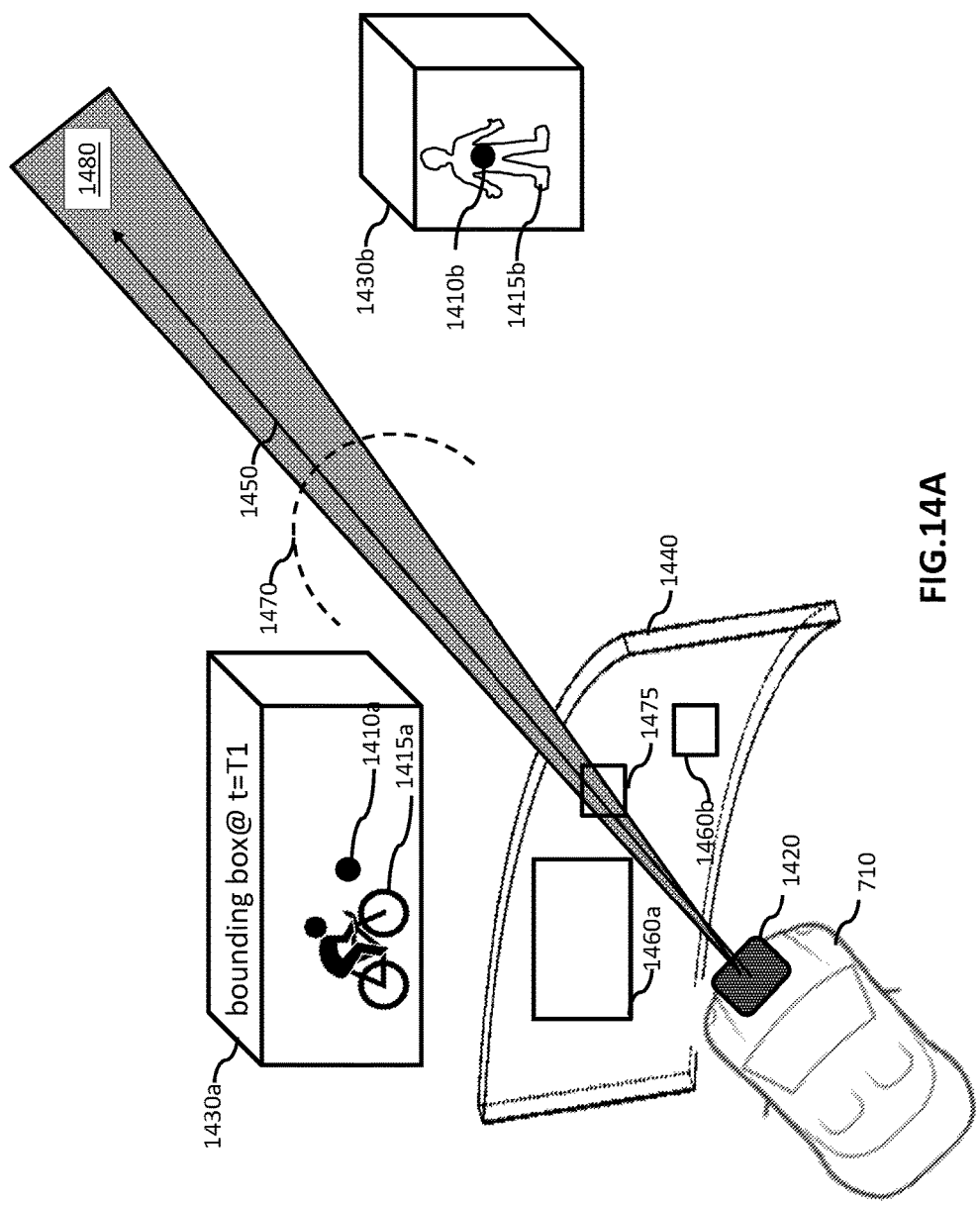
FIGS. 14A and 14B are example conceptual illustrations of controlling the operation of a laser device on a vehicle.

FIG. 14A illustrates a laser range finder 1420 that generates a set of laser pulses, with pulses intensities based location estimates for a set of objects and the associated age of the location estimates. In several embodiments the age of a location estimate of an object can serve be used to determine a range of possible locations for the object at some future time when the range finder is generating laser pulses.

Driving a vehicle often requires near-real time object tracking. In the process of driving a vehicle objects in the vicinity of the vehicle are often constantly changing location relative to the vehicle. For example, a vehicle driver who identifies a location estimate for a cyclist 1415a can instinctually associate an age with the location estimate indicative of the time elapsed since they estimated the location of the cyclist. When the age is low (i.e. the location estimate for the cyclist is very recent) the driver may perform a precise maneuver with the vehicle (e.g. crossing over an associated bicycle lane). Conversely, the driver may decide to be more cautious if the age associated with the cyclist location estimate becomes too large (e.g. the location estimate becomes greater than 5 seconds old).

Turning to FIG. 14A a laser range finder 1420 can apply a similar principal of aging location estimates to the process of generating high-intensity laser pulses. For example, when location estimates are sufficiently current a laser range finder may identify that a region of the FOV is free of objects within a threshold distance and generate high-intensity laser pulses. Conversely, object location estimates become too old the laser range finder may lose confidence that a region of the FOV is free of objects and therefore generate lower-intensity laser pulses instead.

In the embodiment of FIG. 14A a laser range finder 1420 receives a location estimate (e.g. 1410a and 1410b) for each object in a set of objects (e.g. cyclist 1415b and person 1415b). Location estimates 1410a and 1410b can be 3D locations in the vicinity of laser range finder 1420 or 2D location estimates in the FOV 1440 of laser range finder 1420. Location estimates can be provided to a processing subassembly in laser range finder 1420 or calculated by the processing subassembly based on sensor data (e.g. sensor data from a detector in laser range finder 1420, radar sensors, cameras or ultrasound sensors). Laser range finder 1420 can obtain an age associated with each location estimate. The age can be in the form of a time or number of clock cycles indicating the age of the location estimate associated with the corresponding object. For example, the age can be a number of clock cycles or milliseconds since the data used to obtain a location estimate was obtained or since the location estimate itself as calculated.

For each object in the set of objects the corresponding age and the corresponding location estimate can be used to generate a location probability distribution. The location probability distribution for an object (e.g. cyclist 1415a) can be a function or a database of probabilities such that for a candidate 2D or 3D location in the vicinity of the location estimate (e.g. location estimate 1410a) the location probability distribution can indicate a probability that the corresponding object (e.g. cyclist 1415a) occupies the candidate location at some time in the future. The location probability distribution can be based at least in part on a trajectory or direction of travel obtained for an object. For example, laser range finder 1420 can sense a greater velocity (e.g. rate of angular change in the FOV) for cyclist 1415a than pedestrian 1415b. Similarly, cyclist 1415a can be closer to the laser range finder and thereby subtend a larger range of angles per unit time. The laser range finder can calculate a perceived velocity for each object in the set of objects and use the perceived velocity to calculate the location probability distribution at some later time. For each object a threshold can be applied to the corresponding location probability distribution (e.g. a threshold that the probability of occupying a candidate location must be greater than 0.005). Laser range finer 1420 can determine for each object of the set of objects a corresponding object zone (e.g. portion of the surrounding vicinity) in which the location probability is greater than the threshold probability. Alternatively, an object zone corresponding to an object can be a set of 3D locations comprising a region within which the integrated probability of finding the object is greater than a threshold (e.g. the region in which there is a 95% probability of finding cyclist 1415a). For example, laser range finder 1420 can construct bounding box 1430a indicative of the object zone in which there is a 95% probability of finding cyclist 1415a at some time (e.g. at time=T1=2 seconds) after the location estimate 1410*a*. The bounding boxes 1430*a* and 1430*b* or similar object zones determined by a location probability threshold can have a 2D projection onto the FOV 1440, thereby generating corresponding object regions 1460*a* and 1460*b* within the FOV. Alternatively, laser range finder 1420 can calculate for each object an updated location estimate based on measurement data providing an initial location estimate, a trajectory and an age of the initial location estimate. In this way the updated location estimate for each object in the set of objects is a prediction of the present location of the object based on the initial location estimate and a measured trajectory.

Laser range finder 1420 can generate a set of laser pulses (e.g. pulse 1450) in a region 1475 of the FOV 1440. The intensity of each laser pulse in the set of laser pulses can be based at least in part on the corresponding location estimate (e.g. 1410*a*) and the corresponding age for at least one object in the set of objects in the vicinity. In an alternative embodiment each laser pulse can have an intensity based at least in part on a location probability distribution for an object. In yet another embodiment each laser pulses can have an intensity based at least in part on object zone (e.g. 1430*a*), an object region (e.g. 1460*a* or 1460*b*) or an updated location estimate for an object in the set of objects. In one embodiment of FIG. 14A laser range finder can identify that at time T1 the bounding boxes 1430*a* and 1430*b* (e.g. object zones indicating the bounds of where objects can reasonably exist at some time T1 after an location estimate) do not touch the zone 1480 and thereby generate high-intensity laser pulses in zone 1480 (e.g. laser pulse 1450).

In a similar embodiment laser range finder 1420 can identify that at time T1 the object regions 1460*a* and 1460*b* (e.g. the projections of object zones corresponding to objects onto the FOV) do not touch region 1475 in which the set of adaptive intensity laser pulses are generated and hence laser range finder 1420 can generate high-intensity laser pulses with directions in region 1475 of the FOV (e.g. laser pulse 1450).

In this way laser range finder 1420 uses the age of the location estimates to expand the zones of the vicinity (or regions of the FOV) where object are likely to exist. High-intensity laser pulses can have an initial intensity that is above an eye-safe threshold intensity and remain above the eye-safe intensity up to a threshold distance 1470. In the embodiment of FIG. 14A high-intensity laser pulses are generated when the location of a set of objects cannot reasonable intersect with the path of high-intensity laser pulses.

Figure 14B:
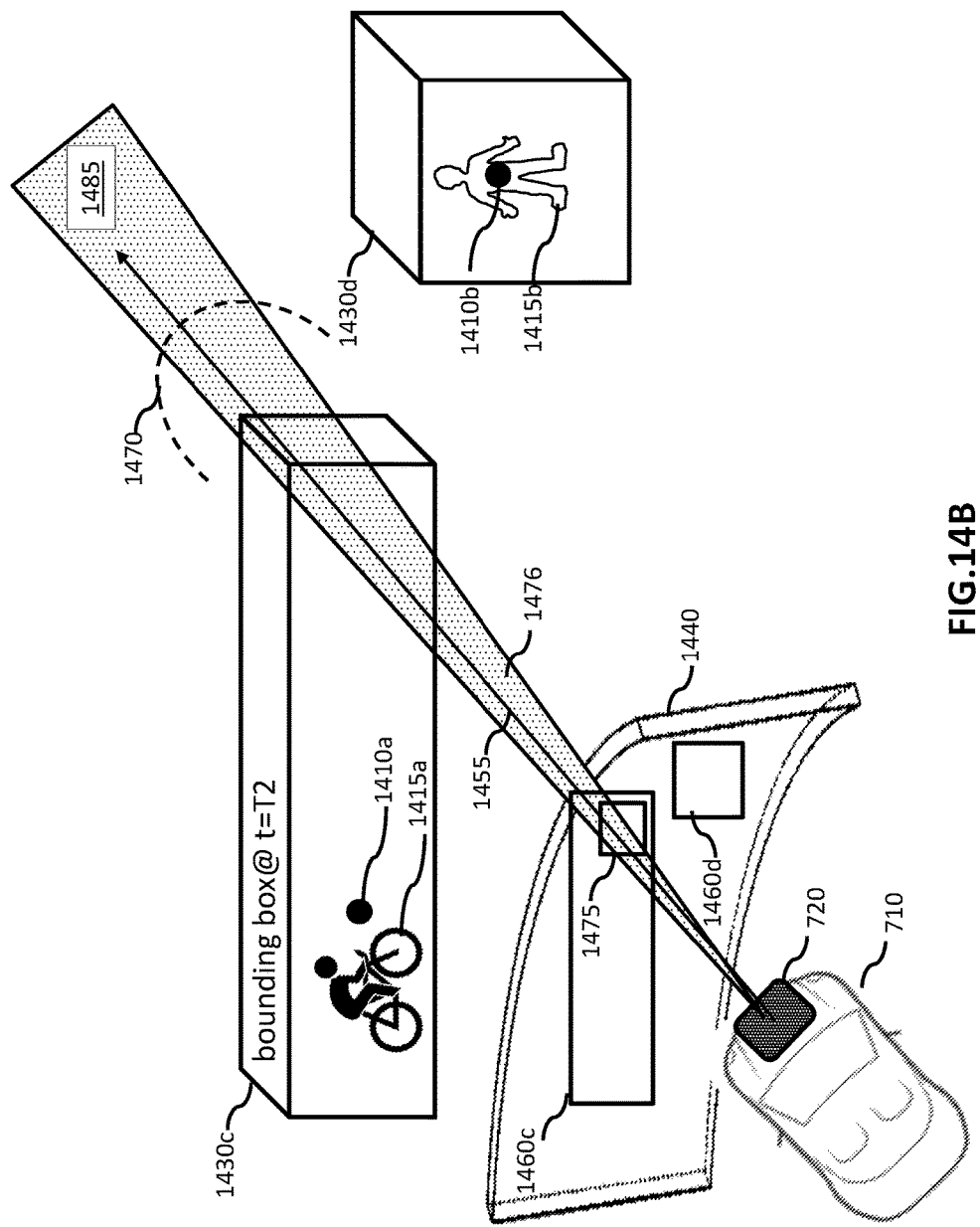

FIG. 14B illustrates the same laser range finder 1420 at some time T2 after obtaining a set of location estimates for objects in the FOV. In FIG. 14B time T2 is greater than T1. Location estimates 1410*a* and 1410*b* are the same as in FIG. 14A, thereby indicating an initial estimate at some time t=0. The object zones indicated by bounding boxes 1430*c* and 1430*d* are larger than the corresponding object zones at t=T1, thereby indicating a wider range of possible locations for objects 1415*a* and 1415*b*. In particular, the projection of bounding box 1430*c* onto the FOV generates an object region 1460*c* that intersects the region of adaptive intensity laser pulses 1475. Hence the validity of an object-free keepout zone 1476 cannot be guaranteed. Laser range finder 1420 can generate a lower-intensity set of laser pulses (e.g. pulse 1450) that eliminates the keepout zone, based in part on the intersection of object region 1460*c* with adaptive-intensity region 1475.

Figure 15:
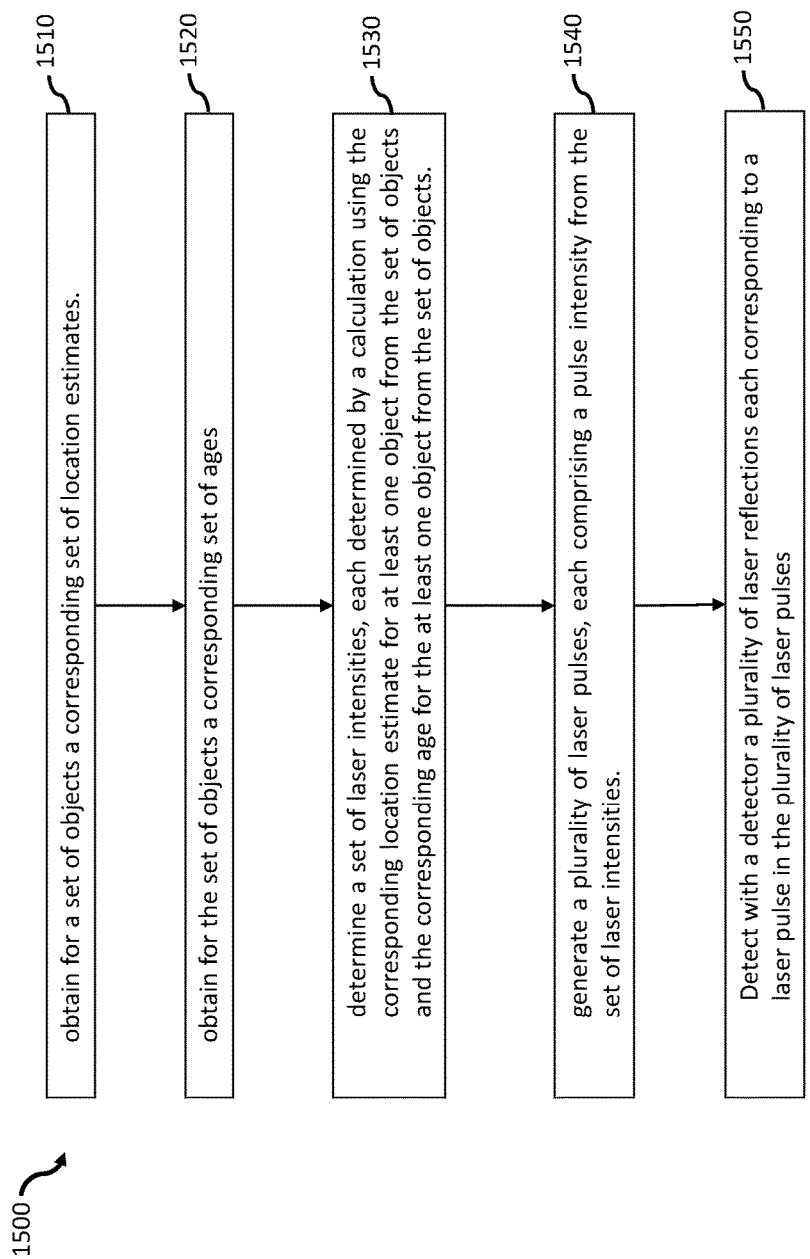
FIG. 15 illustrates a flow diagram of methods for generating a plurality of laser pulses with adaptive intensity based on aspects of a set of objects in the vicinity of a laser range finder.

FIG. 15 is a flow chart for a method 1500 to adapt the intensity of laser pulses generated by a laser range finder based, on the possible locations of objects in the FOV. At step 1510 the method obtains for a set of objects a corresponding set of location estimates. At step 1520 the method obtains for the set of objects a corresponding set of ages indicating the time elapsed since the data used to generate the location estimates was gathered. At step 1530 the method determines a set of laser intensities; each calculated using for at least one object from the set of objects the corresponding location estimate and the corresponding age.

Figure 16:
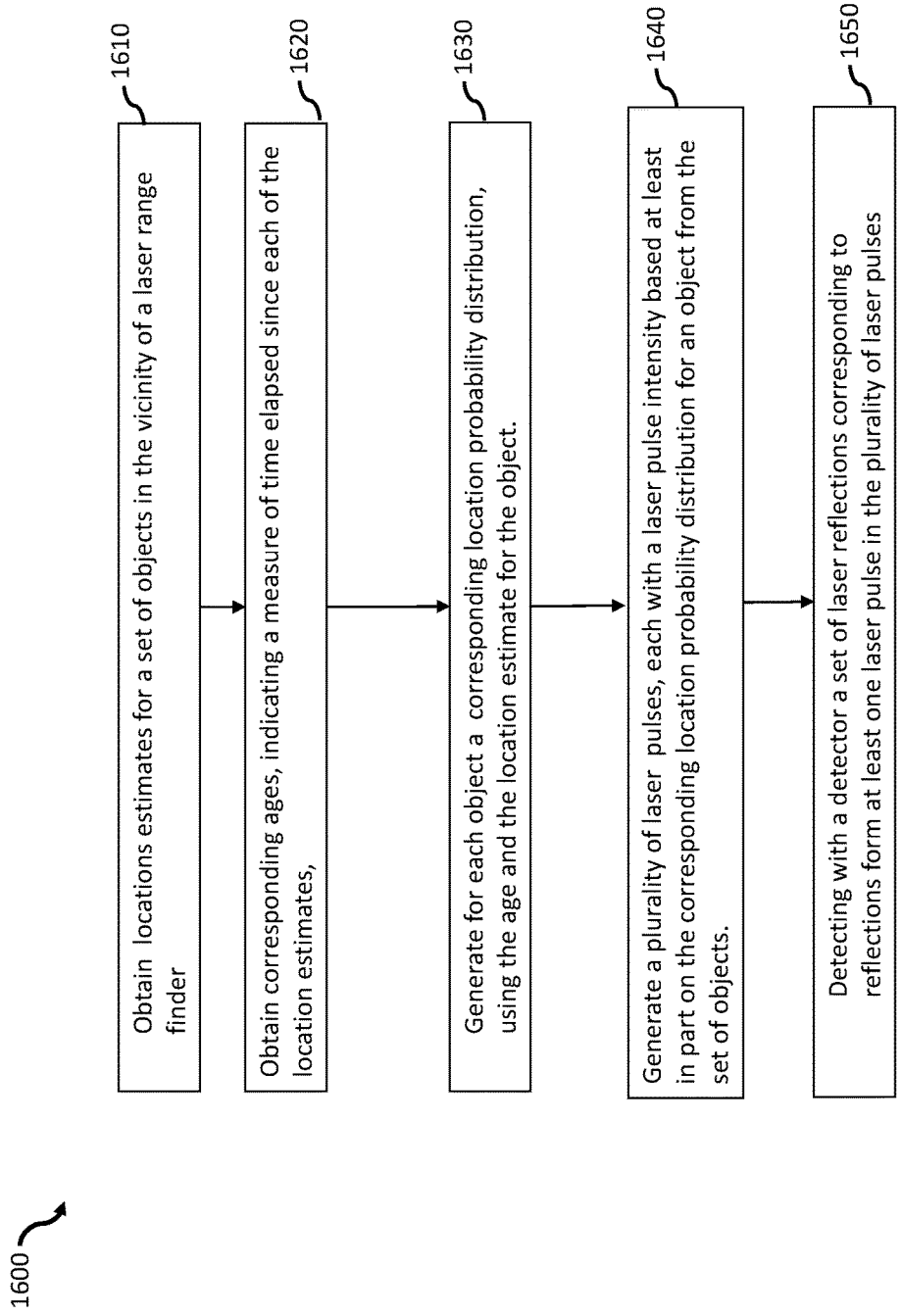
FIG. 16 illustrates a flow diagram of methods for generating a plurality of laser pulses with adaptive intensity based on aspects of a set of objects in the vicinity of a laser range finder.

At step 1540 the method generates with the laser range finder a plurality of laser pulses, each comprising a laser pulse intensity from the set of laser intensities. At step 1550 the method detects with a detector in the laser range finder a plurality of laser reflections each corresponding to a laser pulse in the plurality of laser pulses FIG. 16 is a flow chart for a method 1600 to generate a plurality of laser pulses with intensities selected based on the probability of finding each object in a set of objects within a FOV.

At step 1610 the method obtains a location estimate each object in a set of objects in the vicinity of a laser range finder. At step 1620 the method obtains for each object in the set of objects a corresponding age indicative of the time elapsed since the data indicating the location estimate of the corresponding object was gathered. At step 1630 the method generates for each object in the set of objects a corresponding location probability distribution, using the age and the location estimate for the object. At 1640 the method generates with a laser range finder a plurality of laser pulses, each with a laser pulse intensity based at least in part on the corresponding location probability distribution for an object from the set of objects. At step 1650 the method detects with a detector in the laser range finder a plurality of laser reflections, each resulting from at least one laser pulse in the plurality of laser pulses.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A method comprising:
generating with a laser range finder, having a field of view:
a first set of laser pulses in an adaptive-intensity region of the field of view, each with an intensity at the laser range finder above a threshold intensity; and
a guard set of laser pulses in a guard region of the field of view, each with an intensity at the laser range finder at or below the threshold intensity;
detecting with a detector in the laser range finder a set of laser reflections from the guard set of laser pulses;
sensing a trajectory of an object using the set of laser reflections and determining if the trajectory of the object is directed into the adaptive-intensity region; and
in response to sensing the trajectory of the object, discontinuing the first set of laser pulses and generating a second set of laser pulses in the adaptive-intensity region each with an intensity at the laser range finder at or below the threshold intensity when the trajectory of the object is directed into the adaptive-intensity region.

2. The method of claim 1 wherein the guard region is located relative to the adaptive-intensity region in the field of view such that a plurality of straight line paths, from an edge of the field of view to a perimeter of the adaptive-intensity region, traverse the guard region of the field of view before reaching the perimeter of the adaptive-intensity region.

3. The method of claim 1 wherein the laser range finder is attached to a vehicle and wherein the threshold intensity is based at least in part on a speed of the vehicle.

4. The method claim 1 further comprising the step of generating an object classification for the object using the set of laser reflections; and
wherein the step of generating the second set of laser pulses in the adaptive-intensity region each with the intensity below the threshold intensity is performed at least in part in response to the object classification.

5. The method of claim 1 wherein the guard region encompasses at least some of a perimeter of the adaptive-intensity region in the field of view.

6. The method of claim 1 wherein the guard region and the adaptive intensity region of the field of view are mutually exclusive regions of the field of view.

7. The method of claim 1 wherein the adaptive-intensity region has a perimeter in the field of view and wherein the guard region encompasses the perimeter of the adaptive-intensity region.

8. The method of claim 1 wherein the first set of laser pulses and the guard set of laser pulses are generated in a single scan of the field of view.

9. The method of claim 1 further comprising the steps of:
receiving at a steerable laser assembly in the laser range finder a set of laser steering parameters;
dynamically steering with the steerable laser assembly at least one laser beam using the set of laser steering parameters; and
thereby generating the first set of laser pulses.

10. The method of claim 1 further comprising the steps of:
receiving at a steerable laser assembly a set of laser steering parameters; and
dynamically steering with the steerable laser assembly at least one laser beam; to thereby generate the guard set of laser pulses and the first set of laser pulses in a single scan of the field of view.

11. The method of claim 1 wherein the second set of laser pulses in the adaptive-intensity region each with an intensity below the threshold intensity are generated in response to sensing, using at least some of the set of laser reflections, that the object in the guard region of the field of view is located within a threshold distance of the laser range finder.

12. The method of claim 1, wherein the threshold intensity is an eye-safe intensity.

13. The method of claim 1 wherein the laser range finder is attached to a vehicle;
wherein the set of guard pulses are generated in a range of directions; and
wherein the range of directions for the set of guard pulses is based at least in part on a speed of the vehicle.

14. The method of claim 1 further comprising the steps of generating with a steerable laser assembly,
a preliminary set of laser pulses in the guard region of the field of view, each with an intensity below the threshold intensity;
detecting with the detector a preliminary set of laser reflections corresponding to the preliminary set of laser pulses and thereby generating preliminary reflection data;
evaluating a safety criterion using at least some of the preliminary reflection data to generate a result; and
generating the first set of laser pulses in response to the result.

15. The method of claim 1 further comprising the step of in response to sensing the object, ceasing to generate laser pulses above the threshold intensity and wherein the second set of laser pulses are operable to replace the first set of laser pulses in the adaptive-intensity region of the field of view.

16. The method of claim 1 further comprising the steps of computing a distance to the object;
determining whether the distance is less than a threshold distance; and
generated the second set of laser pulses in the adaptive-intensity region, based at least in part on whether the distance to the object is less than the threshold distance.

17. A method comprising:
generating with a laser range finder, having a field of view and a detector, a first set of laser pulses in an adaptive-intensity region of the field of view, each with an intensity at the laser range finder above a threshold intensity, and a guard set of laser pulses in a guard region of the field of view, each with an intensity at the laser range finder at or below the threshold intensity;
detecting with the detector a set of laser reflections corresponding to the guard set of laser pulses and thereby generating reflection data;
sensing a trajectory of an object using the set of laser reflections comprising: processing at least some of the reflection data to identify one or more aspects of the object in the guard region including the trajectory, and determining if the trajectory of the object is directed into the adaptive-intensity region; and
in response to identifying the one or more aspects of the object, discontinuing the first set of laser pulses and generating a second set of laser pulses in the adaptive-intensity region each with an intensity at the laser range finder at or below the threshold intensity before the object enters the adaptive-intensity region when the trajectory of the object is directed into the adaptive-intensity region.

18. The method of claim 17 wherein the guard region is located relative to the adaptive-intensity region such that a plurality of straight line paths, from an edge of the field of view to a perimeter of the adaptive-intensity region, traverse the guard region before reaching the perimeter of the adaptive-intensity region.

19. The method of claim 17 further comprising the steps of performing a safety test using the reflection data and thereby generate a result; and in response to the result, generating the second set of laser pulses in the adaptive-intensity region, each with the intensity below the threshold intensity.

20. The method of claim 17 further comprising the step of processing the at least some of the reflection data comprises the step of measuring a distance to the object; and
wherein the step of identifying the one or more aspects of the object comprises identifying whether the object is within a threshold distance of the laser range finder.

21. The method of claim 17 wherein the step of processing the at least some of the reflection data to identify the one or more aspects of the object comprises measuring a distance to the object using the at least some of the reflection data.

22. The method of claim 17 wherein the one or more aspects of the object comprises a location of the object within the guard region of the field of view.

23. A laser range finder comprising:
a steerable laser assembly comprising one or more laser generators;
to generate a first set of laser pulses in an adaptive-intensity region of a field of view, each with an intensity at the laser range finder above a threshold intensity; and
to generate a guard set of laser pulses in a guard region of the field of view, each with an intensity at the laser range finder at or below the threshold intensity;
a detector to detect a set of laser reflections from the guard region, corresponding to the guard set of laser pulses; and
electronic circuitry operably coupled to the detector;
to sense, using the set of laser reflections, at least one aspect of an object in the guard region including a trajectory, and to determine if the trajectory of the object is directed into the adaptive-intensity region; and
in response to sensing the at least one aspect of the object in the guard region, to instruct the steerable laser assembly to discontinue the first set of laser pulses and to generate a second set of laser pulses in the adaptive-intensity region, each with an intensity at the laser range finder at or below the threshold intensity before the object enters the adaptive-intensity region when the trajectory of the object is directed into the adaptive-intensity region.

24. The laser range finder of claim 23 wherein the guard region is defined as a region of the field of view that encompasses the guard set of laser pulses; where the steerable laser assembly is configured to generate the guard set of laser pulses such that the guard region is located relative to the adaptive-intensity region such that a plurality of straight line paths, from an edge of the field of view to a perimeter of the adaptive-intensity region, traverse the guard region before reaching the perimeter of the adaptive-intensity region.

25. The laser range finder of claim 23 wherein the one or more laser generators comprises a first laser generator to generate the first set of laser pulses and a second laser generator to generate the guard set of laser pulses.

26. The laser range finder of claim 23 wherein the steerable laser assembly comprises
a first laser generator, with variable intensity, to generate at least some of the first and second sets of laser pulses in the adaptive-intensity region and
a second laser generator exclusive from the first laser generator, to generate the guard set of laser pulses.

27. The laser range finder of claim 23, wherein the steerable laser assembly rotates about an axis with a direction of rotation;
wherein the steerable laser assembly comprises a guard laser generator to generates the guard set of laser pulses and an adaptive intensity laser generator to generate the first set of laser pulses; and
wherein the guard laser generator is positioned relative to the adaptive intensity laser generator such that the guard set of laser pulses leads the first set of laser pulses in the direction of rotation.

28. The laser range finder of claim 23 wherein the electronic circuitry is configured
to calculate a distance from the object to the laser range finder using the set of laser reflections from the guard region; and
wherein the electronic circuitry is configured to select the intensity below the threshold intensity of the second set of laser pulses, based at least in part on the distance from the object to the laser range finder.

* * * * *